(12) United States Patent
Taniguchi et al.

(10) Patent No.: US 6,445,679 B1
(45) Date of Patent: Sep. 3, 2002

(54) STREAM COMMUNICATION SYSTEM AND STREAM TRANSFER CONTROL METHOD

(75) Inventors: Koji Taniguchi, Kawasaki; Hideaki Tani, Tokyo, both of (JP)

(73) Assignee: Digital Vision Laboratories Corporation, Tokyo (JP)

( * ) Notice: Subject to any disclaimer, the term of this patent is extended or adjusted under 35 U.S.C. 154(b) by 0 days.

(21) Appl. No.: 09/220,966

(22) Filed: Dec. 23, 1998

(30) Foreign Application Priority Data

May 29, 1998 (JP) .......................................... 10-149342

(51) Int. Cl.[7] .............................................. H04L 12/26
(52) U.S. Cl. ...................................... 370/232; 370/236
(58) Field of Search ................................ 370/229, 230, 370/230.1, 231, 232, 233, 234, 235, 236, 252, 253, 400, 410, 428, 429, 395.2, 395.21, 395.4, 395.41, 395.42, 468

(56) References Cited

U.S. PATENT DOCUMENTS

| | | | |
|---|---|---|---|
| 5,208,805 A | | 5/1993 | Ochiai |
| 5,313,454 A | * | 5/1994 | Bustini et al. ............... 370/231 |
| 5,361,091 A | | 11/1994 | Hoarty et al. |
| 5,388,089 A | | 2/1995 | Odaka et al. |
| 5,485,370 A | | 1/1996 | Moss et al. |
| 5,559,549 A | | 9/1996 | Hendricks et al. |
| 5,633,861 A | | 5/1997 | Hanson et al. |
| 6,047,328 A | * | 4/2000 | Charny et al. ............... 709/233 |
| 6,061,330 A | * | 5/2000 | Johansson .................... 370/229 |
| 6,167,028 A | * | 12/2000 | Harris ......................... 370/230 |
| 6,208,653 B1 | * | 3/2001 | Ogawa et al. ............... 370/395 |
| 6,222,841 B1 | | 4/2001 | Taniguchi |
| 6,259,696 B1 | * | 7/2001 | Yazaki et al. ................ 370/395 |

* cited by examiner

Primary Examiner—Kwang Bin Yao
(74) Attorney, Agent, or Firm—Christensen O'Connor Johnson Kindness PLLC

(57) ABSTRACT

A stream communication system has a plurality of nodes and a network to which each node is connected, the node comprises a stream transfer device to which the encoding stream that data attribute information for every data blocks are added, and has a periodicity in the data structure is transferred, at least one node is allocated as a managing node, and the managing node manages at least one monitoring target node and a control target node, the stream transfer device of the control target node comprises stream conversion section for adjusting an amount of the transfer data as the effective transmission rate coincides to the specified transmission rate based on the data priority decided from data attribute information, the stream transfer device of the monitoring target node comprises internal information notification section for notifying the managing node the state of a load of the node, and the stream transfer device of the managing node comprises feedback control section for recalculating the transmission rate for real time transmission, and for notifying the control target node the result as a parameter setting message based on the load state notified from the monitoring target node and the set transmission rate.

23 Claims, 27 Drawing Sheets

MODULE LOAD RECORD TABLE 600

| NUMBER | MODULE TYPE | No. 1 | No. 2 | No. 3 | No. 4 | No. 5 | No. 6 | No. 7 | No. 8 |
|---|---|---|---|---|---|---|---|---|---|
| 0 | DOR | 2 | 1 | 1 | 1 | 0 | 0 | 0 | 0 |
| 1 | RTF1 | 1 | 2 | 1 | 0 | 0 | 1 | 0 | 0 |
| 2 | RTF2 | 2 | 2 | 1 | 1 | 1 | 1 | 0 | 0 |

DATA SHIFT DIRECTION ⟶

FIG. 16A

QoS JUDGMENT MATRIX TABLE 710

| | | NODE LOAD ($NL_{new}$) | | |
|---|---|---|---|---|
| | | LOAD IS LARGE (2) | LOAD IS PROPER (1) | LOAD IS SMALL (0) |
| LINK LOAD ($LL_{new}$) | LOAD IS LARGE (2) | DOWN | DOWN | DOWN |
| | LOAD IS PROPER (1) | DOWN | KEEP | KEEP |
| | LOAD IS SMALL (0) | DOWN | KEEP | UP |

FIG. 16B

QoS JUDGMENT MATRIX TABLE 710'

| | | NODE LOAD ($NL_{new}$) | | |
|---|---|---|---|---|
| | | LOAD IS LARGE (2) | LOAD IS PROPER (1) | LOAD IS SMALL (0) |
| LINK LOAD ($LL_{new}$) | LOAD IS LARGE (2) | DOWN | DOWN | DOWN |
| | LOAD IS PROPER (1) | DOWN | KEEP | UP |
| | LOAD IS SMALL (0) | DOWN | UP | UP |

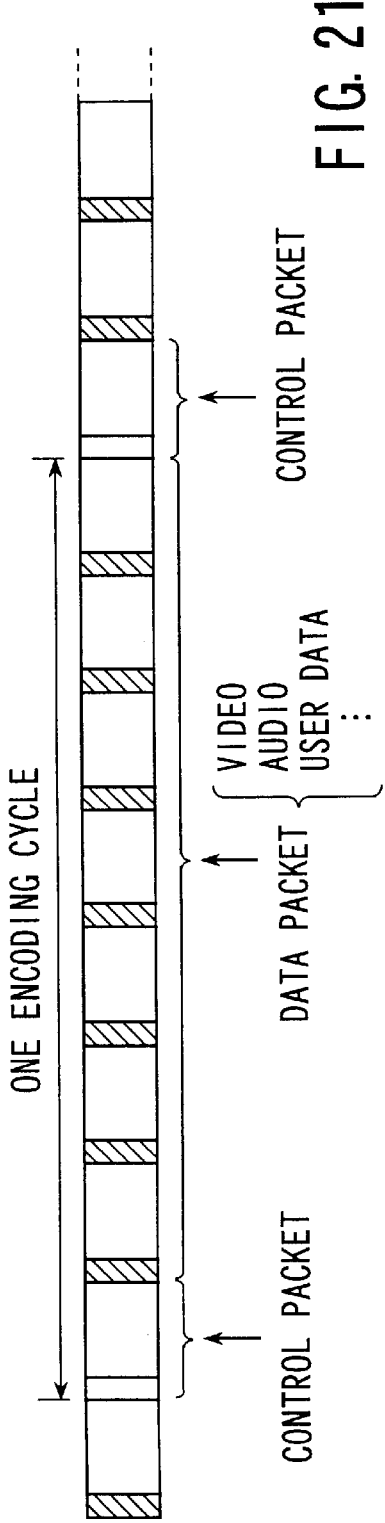
FIG. 21
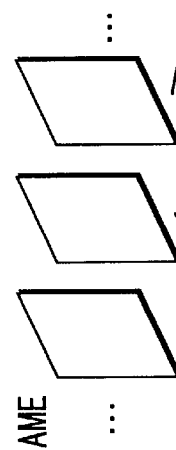
FIG. 24A
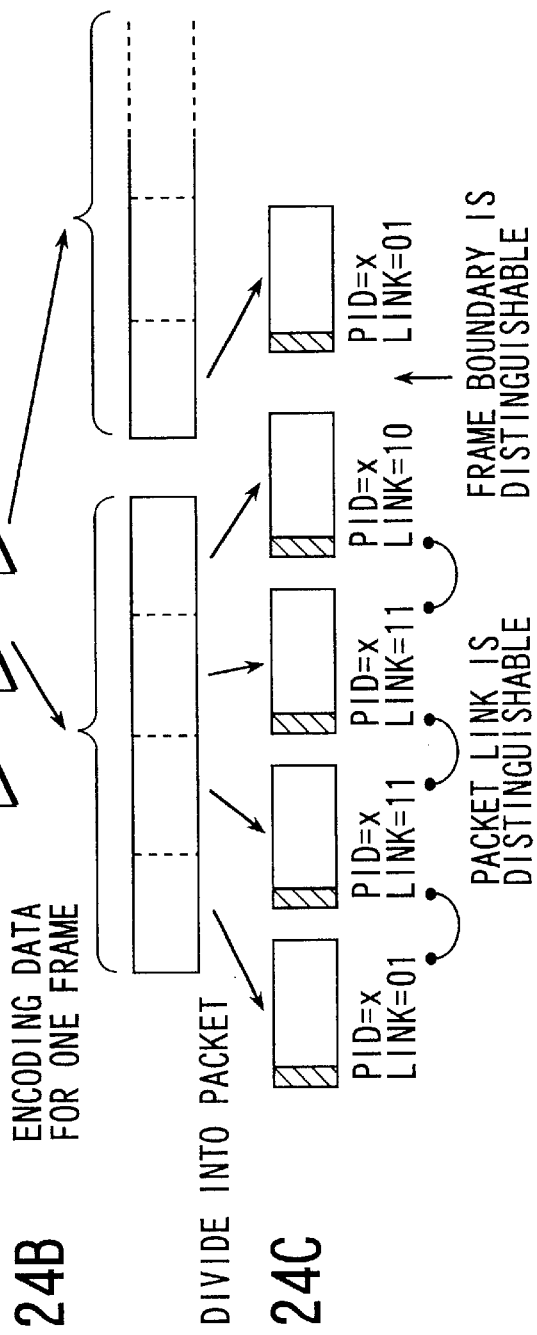
FIG. 24B
FIG. 24C

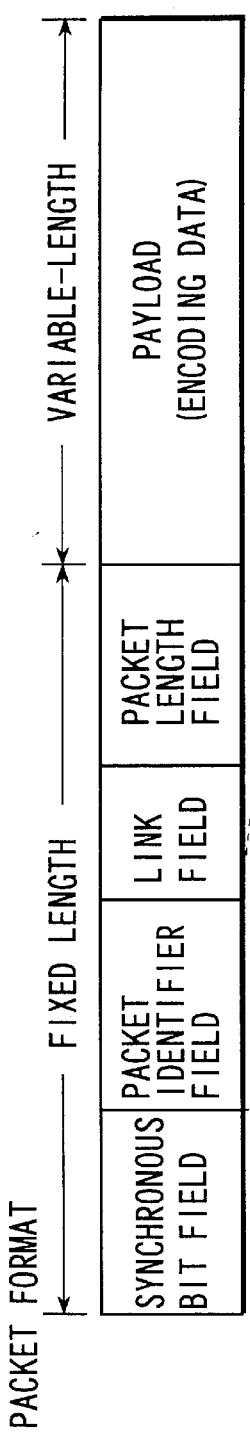
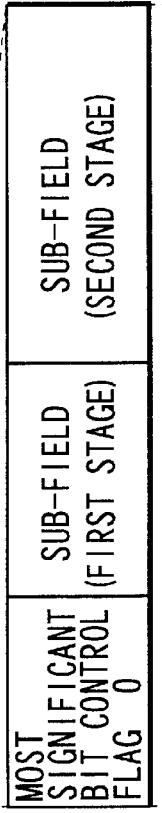
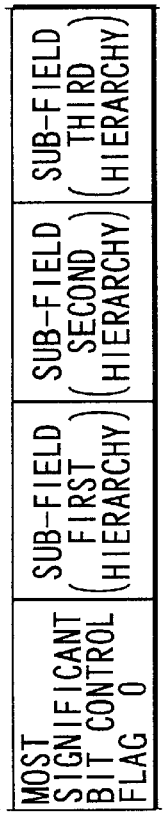
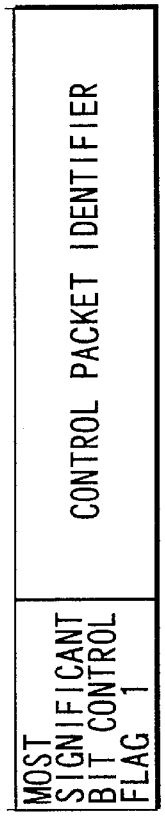
FIG. 22A PACKET FORMAT
FIG. 22B EXAMPLE OF DATA PACKET (1)
FIG. 22C EXAMPLE OF DATA PACKET (2)
FIG. 22D EXAMPLE OF CONTROL PACKET
IN THIS EXAMPLE, IT IS DETERMINED AS CONTROL PACKET AT CONTROL FLAG = 1, AND AS DATA PACKET AT CONTROL FLAG = 0

HIERARCHY OF PACKET IDENTIFIER

| FIRST HIERARCHY | SECOND HIERARCHY | THIRD HIERARCHY |
|---|---|---|
| PROGRAM 1 | VIDEO | SYSTEM |
| | | I PICTURE |
| | | P PICTURE |
| | | B PICTURE |
| | AUDIO | — |
| | USER DATA | — |
| PROGRAM 2 | VIDEO | SYSTEM |
| | | I PICTURE |
| | | P PICTURE |
| | | B PICTURE |
| | AUDIO | — |
| | USER DATA | — |

FIG. 23

| CYCLE | TRANSMISSION PERMISSIBLE PRIORITY | NUMBER OF TRANSMISSION PERMISSIBLE FRAMES | NUMBER OF TRANSMISSION FRAMES | FRAME EXCESS FLAG |
|---|---|---|---|---|
| 1 START | 1 | 1 | 0 | 0 |
| 1 END | 1 | 1 | 1 | 0 |
| 2 START | 2 | 1 | 0 | 0 |
| 2 END | 2 | 1 | 1 | 1 |
| 3 START | 2 | 2 | 0 | 0 |
| 3 END | 2 | 2 | 2 | 1 |
| 4 START | 2 | 3 | 0 | 0 |
| 4 END | 2 | 3 | 3 | 1 |
| 5 START | 2 | 4 | 0 | 0 |
| 5 END | 2 | 4 | 4 | 0 |
| 6 START | 3 | 1 | 0 | 0 |
| 6 END | 3 | 1 | 1 | 1 |
| 7 START | 3 | 2 | 0 | 0 |
| 7 END | 3 | 2 | 2 | 1 |
| 8 START | 3 | 3 | 0 | 0 |
| 8 END | 3 | 3 | 3 | 1 |
| 9 START | 3 | 4 | 0 | 0 |
| 9 END | 3 | 4 | 4 | 1 |
| ... | ... | ... | ... | ... |
| 15 START | 3 | 10 | 0 | 0 |
| 15 END | 3 | 10 | 10 | 0 |

FIG. 29

(NOTE)
1 START : START OF FIRST CYCLE
1 END : END OF FIRST CYCLE

STREAM COMMUNICATION SYSTEM AND STREAM TRANSFER CONTROL METHOD

BACKGROUND OF THE INVENTION

The present invention relates to a stream communication system in which there is transferred an encoding stream for which real time mode of operation is required as in video, audio and the like and particularly, to a stream communication system and a stream transfer control method for automatically controlling parameters relating to stream transfer following load variations by a feed back system while giving consideration to a quality of a transfer stream.

In company with progress in a computer network technology and a communication technology for digital information, a communication system has, in recent years, been developed; the communication system is called a stream communication system, in which there is handled a multimedia stream represented by an encoding image stream, an encoding image stream including speech information and the like, in other words a real time stream which requires real time mode of operation.

There are known methods by which real time transfer adopted in communication systems of this kind is maintained.

A first method is to adjust a sending data volume by annulling (discarding) part of data in a stream, but there is a fear in the first method that important part is lost.

A second method is to execute stationary filtering processing based on data priorities and to maintain real time transfer while keeping back as much important part of the data as possible. As a concrete example of the second method, there has been known a method in which several levels (data priorities) are provided by picture types in a system in which a MPEG (Moving Picture Experts Group) video stream is handled. This method has a feature that there are executed rate control by stepwise specification including transfer of all data, annulment (discard) of B picture, annulment of B, P pictures and annulment of all video (transfer of audio only). According to this method, for example in a situation where transfer of all data cannot be continued, even one frame of the B picture cannot be transferred. In other words, since the second method adopts an extremely discrete rate control and besides a transmission rate is not constant, real time transfer is not to be maintained while keeping a quality at a highest level attainable in the second method.

As described above, methods which have conventionally been known in which real time transfer is maintained (the first and second methods) are not to dynamically adjust a transmission data volume while giving consideration to a stream quality in real time transfer of a multimedia stream (encoding stream) and a transmission rate cannot, accordingly, be specified.

A third method is to reserve a network band (transmission rate) in advance of performing steam transfer and thereby guarantee QoS (Quality of Service). In the third method, however, it is only judged whether or not a reservation is allowed and when there is no room in the band for use, no reservation is allowed and no transmission can thus be performed. This means to restrict the number of users and no control is performed in such a manner that there is attained a band as close to the user's desirable band as possible.

BRIEF SUMMARY OF THE INVENTION

It is an object of the present invention to provide a stream communication system and a stream transfer control method in which dynamic adjustment of a transmission rate is enabled while not only is real time mode of operation maintained, but a quality is also maintained at a highest level attainable, even when load variations arise, by processing in which the load variations in a network or a system is fed back to an upstream side, the load variations is followed on the upstream side and a transmission data volume is decreased through automatic annulment of data part with a lower priority.

It is another object of the present invention to provide a stream communication system and a stream transfer control method in which a further feed back control is not applied in a time period of a transition state from starting of adjustment of a transmission rate till a requested transmission rate is attained and thereby a system is, with certainty, prevented from becoming unstable.

In order to solve the above problems, the inventor has proposed a method in which a dynamic quality control is enabled by not performing a discrete rate control but a continuous rate control. In this method, a packet with a lower priority (lower degree of importance) in a stream is positively annulled (discarded), and thereby a quality and a transmission rate are both adjusted, whereby an available transmission rate (transfer band) can be made to be as close to a transmission rate specified by a user as possible, while maintaining a quality at a highest level attainable.

The above described methods, however, give no consideration to variations of a load state of a network or a system and there are performed neither quality adjustment nor transmission rate adjustment which is most suitable for the load state. For this reason, it is difficult to maintain a transmission rate which a user specifies in a situation where a load state of a network or a system varies. Real time image stream transfer being taken up as an example, data transfer is generally performed while maintaining a bit rate (encoding rate, content rate) of a content. At this time, when a packet loss arises since a network band is not sufficiently secured or when decode processing of reception data is insufficiently performed due to shortage of a processing capability at a terminal, an image presented to a user is deteriorated in quality.

Therefore, the present invention has (claim 1).

As a feature, in such a constitution, a parameter showing a transmission rate at which there is enabled real time transfer at a control target node is calculated at a node which is assigned with a role as a management node corresponding to the control target node and at least one node located on the downstream side from the control target node which is assigned with a role as a monitoring target node, based on information showing a load state of the at least one node which is notified from (internal state notification means of) the at least one node and on information showing a transmission rate set currently at the control target node, and the parameter is fed back to the control target node. Thereby, at the control target node, there is performed a stream shaping processing in which data part with a lower priority is automatically annulled in order to decrease a data volume, while a less transmission permissible priority is given stepwise and the number of transmission permissible data blocks with the same priority as the transmission permissible priority in the same cycle is increased stepwise so that an actual transmission rate is changed to a new transmission rate shown by the parameter fed back from a current transmission rate.

As a result, even if there are load variations in a network or a system, dynamic adjustment of a transmission rate can be performed while maintaining not only real time mode of operation but a quality at a highest level attainable.

According to (claim 2), feed back control with higher precision can be realized. In the constitution (claim 2-1), it is recommended that at least one module in which a data processing result can be calculated, among modules constituting a monitoring target node, is assigned with a role as a monitoring target module and a node load is judged from a module load obtained from data processing results at all the monitoring target modules in the monitoring target node.

Periodicity in a data structure can be detected with no stream analysis with complexity by adopting a constitution in which there is used an encoding stream in which transmission control reference information as a standard for transfer control is inserted and a transmission permissible priority is updated based on a transmission result in a previous cycle for each cycle when judgment is performed based on the transfer control standard information.

It is recommended that a specified algorithm, that is an algorithm of (claim 5), is adopted for stream shaping processing in stream conversion means.

There can be realized a continuous rate control by which there is achieved an actual transmission rate as close to a specified one as possible while there is transmitted a data block with a highest priority attainable by applying the algorithm and while a relation between a transmission and a quality is clearly maintained.

The present invention has (claim 6).

As a feature, in such a constitution, since in a period of time of a transition state from the time when adjustment of a transmission rate gets started at a control target node according to feed back from a management node till the time when an actual transmission rate reaches to a requested one, feed back control in the management code is stopped according to a transition state starting notification message transmitted from a control target node when the rate adjustment gets started, there is applied no further feed back control to the control target node by the management node in the transition state period of time and it is sure to be prevented from occurring that a system gets unstable.

In a period of time of a non-transition state, that is a period of time of a steady state, since internal state notification messages, each including a parameter which shows a current transmission rate, are transmitted at regular intervals to a management node from stream conversion means of a control target node, a parameter showing a latest transmission rate set at the control target node can constantly be achieved by the management node, whereby feed back with high precision can be performed.

The present invention has a constitution, as a feature, that a plurality of data reception results notified to a management node from a monitoring target node are, in the order of a time series, held in a data reception results buffer adopting a first-in, first-out way and the plurality of data reception results in the buffer are respectively modified by weights in a corresponding manner to the order thereof and an average of the data reception results after the weighing is compared with an upper bound threshold and a lower bound threshold corresponding to a permissible reception rate range which is determined by a transmission rate set currently at control target node and link load results are output in three levels composed of Link Load: Large, Link Load: Proper and Link Load: Small based on the comparison results.

In such a constitution, there is realized load judgment in which a change of link load over time is considered. This constitution can be applied to a module load and a node load as well.

The present invention has a constitution, as a feature, that, since a latest link load judgment result and a latest node load judgment result are stored in latest judgment result holding means, while there is prepared, in advance, matrix table information in which there is written a relation between combinations of all link load judgment results and all node load judgment results, both conceivable in advance, and judgment results in which a control policy for a corresponding control target node is indicated by three levels composed of "Transmission Rate: Increased", "Transmission Rate: Unchanged" and "Transmission Rate: Decreased", only if the matrix table information is referred to based on the combinations of a latest link load judgment result and a latest node load judgment result, a judgment result indicating a control policy for the corresponding control target node can be obtained with ease.

It is recommended that the present invention has a constitution which comprises: a judgment result buffer adopting a first-in, first-out way for storing judgment results, showing the obtained control policy, of n times in the past in the order of a time series; judgment result correction means for correcting a latest judgment result based on continuous judgment results of m times (m≦n) in the past including the latest judgment result in the judgment result buffer when the latest judgment result is stored in the judgment result buffer; and window setting means for setting a window width indicating a value of the m (for example, according to the latest judgment result). Here, it is recommended that if all the judgment results of m times in the past are either "Transmission Rate: Increased" or "Transmission Rate: Decreased", the latest judgment result is output with no correction, if all are "Transmission Rate: Unchanged", the latest judgment result is changed from "Transmission Rate: Unchanged" to "Transmission Rate: Increased" and then output and if different judgment results are mixed, "Transmission Rate: Unchanged" is output regardless of the latest results.

In such a constitution, it is possible to suppress a excessive reaction to pulse-like load variations.

It is recommended that the present invention has a constitution that the feed back control means is provided with transmission rate control range setting means for setting a minimum transmission rate and a maximum transmission rate which shows a control range for a transmission rate according to specification from outside, and when a transmission rate shown by the calculated parameter exceeds the maximum transmission rate, an actual transmission rate is changed to a parameter showing the maximum transmission rate, while when less than the minimum transmission rate, a stream transfer is stopped or an actual transmission rate is changed to a parameter showing the minimum transmission rate and a stream transfer is continued. (claim 15) At this point, it is recommended that the feed back control means is further provided with control mode setting means for setting control modes, according to specification from outside, which specifies so that when a transmission rate shown by the calculated parameter is less than the minimum transmission rate, stream transfer is stopped, or stream transfer is continued changing an actual transmission rate to a parameter showing the minimum transmission rate.

In such a constitution, it is possible to reflect a user's desire on transmission rate adjustment and a control policy for quality adjustment and thereby, there can be realized stream transfer within a range of a cost and a quality desired by a user.

The present invention has a constitution, as a feature, that any of the plurality of nodes except a transmission node (sender node) can be assigned not only with a role as a monitoring target node, but with a role as only one management node for the monitoring target nodes, while a node at the front stage is assigned with a role as only one control target node for the management node.

In such a constitution, each node other than the transmission node in a system works as a management node for a node at the front stage and feed back control (QoS judgment) of the stream transfer section in the system can be performed in a distributed manner.

In the present invention, one of the plurality of nodes is assigned with a role as a management node.

In such a constitution, one node in a system can centrally perform load judgment (QoS judgment) of all the stream transfer system in the system and feed back control (QoS control) based on the judgment results.

As described above, according to the present invention, load variations in a network or a system are fed back from a management node to a control target node on the upstream side and data part with a low priority is automatically annulled whereby a transmission data volume is decreased, while a less transmission permissible priority is given stepwise following the load variations in the control target node and the number of transmission permissible data blocks with the same priority as the transmission permissible priority in the same cycle is increased stepwise. Hence, even if load variations occur, not only is real time mode of operation realized, but a quality is maintained at a highest level attainable, whereby dynamic adjustment of a transmission rate can be performed.

Besides, according to the present invention, in a period of time of a transition state from the time when the dynamic adjustment of a transmission rate gets started at a control target node following feed back from a management node till the time when a required transmission rate is reached, since feed back control in the management node is stopped according to a transition state starting notification message transmitted from the control target node when the rate adjustment gets started, further feed back control by the management node is not overlapped on the control target node and thereby the system is, with. certainty, prevented from being unstable in the transition state period of time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a flow chart for illustration of QoS state monitoring processing by a manager and controller 256;

FIG. 8 is a flow chart for illustration of link load judgment processing by the link load judgment section 252a;

FIG. 9 is a representation showing an example of structure of a link load record table 40 provided in the link load judgment section 252a;

FIG. 16A and FIG. 16B are representations showing examples of a content of a QoS judgment matrix table 710 in FIG. 15 and a content of a QoS judgment matrix table 710' which can substitute for the table 710;

FIG. 21 is a representation for illustration of a encoding stream in which a control packet indicating an encoding cycle is periodically inserted (every GOP as a unit);

FIG. 22A to FIG. 22D are representations for illustration of a structure of a packet format (packet header) applied in the embodiment;

FIG. 23 is a representation for illustration of a hierarchy of packet identifiers applied in the embodiment;

FIG. 24A to FIG. 24C are representations for illustration of a concept of a packet link in the embodiment;

FIG. 29 is a representation showing a way of change of control parameters in each cycle when there is performed transmission of a stream by stream shaping processing, wherein the stream comprises one I picture(priority=1), four P pictures (priority=2) and ten B pictures (priority=3) in one cycle;

DETAILED DESCRIPTION OF THE INVENTION

Below, there will be described an embodiment of the present invention in reference to the accompanying drawings.

Figure 1:
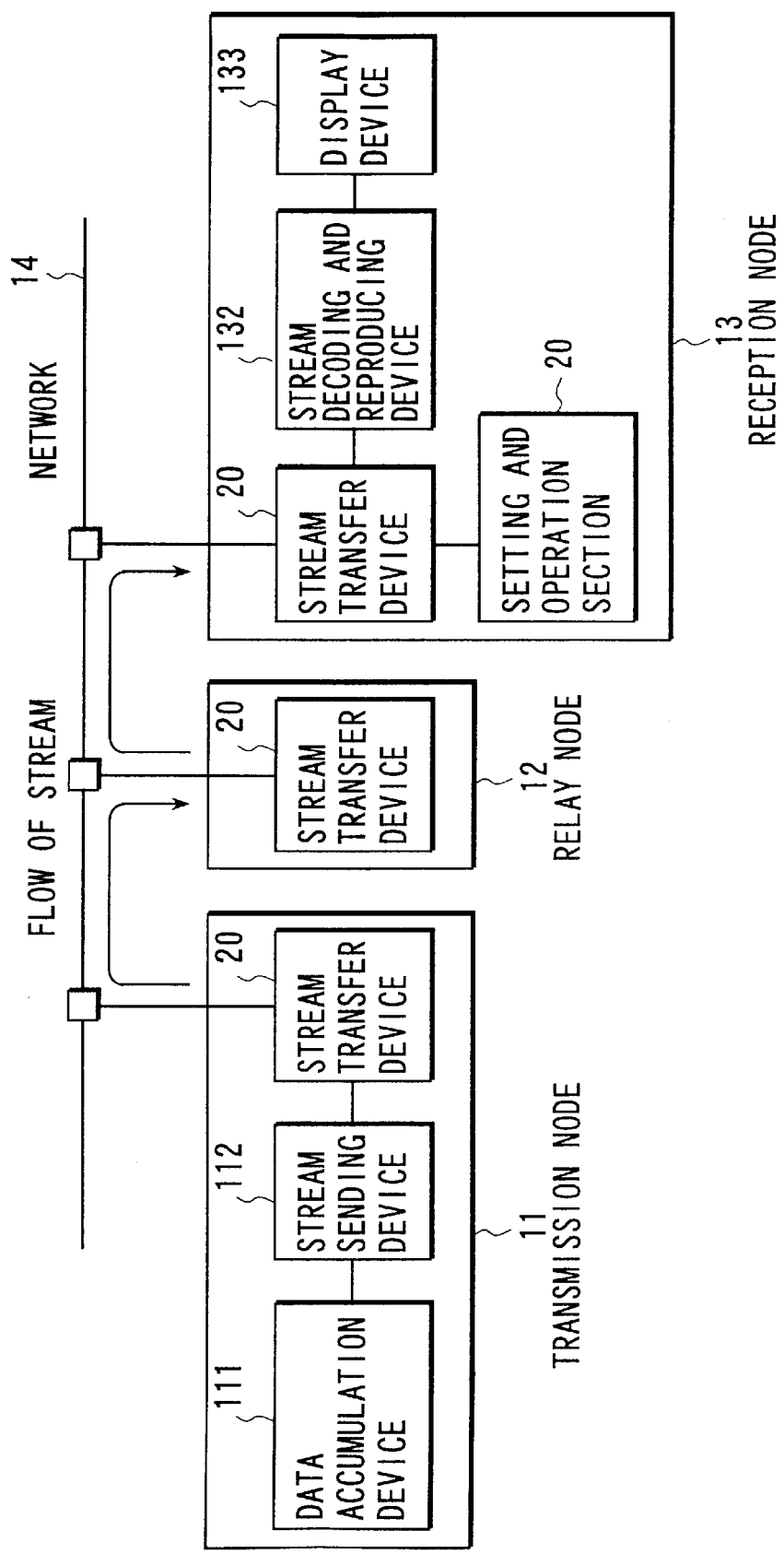
FIG. 1 is a block diagram showing an overall structure of a real time stream transmission system according to an embodiment of the present invention.

FIG. 1 is a block diagram showing an overall structure of a real time stream transmission system according to an embodiment of the present invention.

The stream transmission system of FIG. 1 is a system which realizes a real time transfer of a multimedia stream represented by a encoding image stream including speech information in a network in a multi-user environment and comprises: a transmission node 11; a relay node 12; a reception node 13; and a network 14 to which the nodes are connected. In FIG. 1, although there is adopted a structure in which one relay node 12 is interposed between the transmission node 11 and the reception node 13, either a plurality of relay nodes or no relay node may be interposed therebetween.

The stream communication transmission system in the embodiment has a link type connection relation in which the nodes (11 to 13) are in series connected and there is no branching in the connection relation.

In this case, the transmission node 11 assumes a leading stage and the reception node 13 assumes a final stage. In this system, the number of links is N−1 when the number of nodes is N.

Each of the nodes 11 to 13 has a stream transfer device (a stream reception and transmission device) 20 having a common structure. Each stream transfer device 20 has a modular structure and works as a stream transmission device (when the device is used being equipped in the transmission node 11), a stream relay device (when the device is used being equipped in the relay node 12) or a stream reception device (when the device is used being equipped in the reception node 13).

The reception node 11 comprises: in addition to the steam transfer device 20, a data accumulation device 111 which is constructed with an external storage device such as a hard disk device or the like for accumulation of various kinds of encoding multimedia stream data (packetized stream data); and a stream sending device 112 which reads stream data accumulated in the data accumulation device 111 and sends out the stream data to the stream transfer device 20.

The reception node 13 comprises: in addition to the stream transfer device 20, a setting and operation section 131 which is used for various kinds of setting and operation by a user; a stream decoding and reproducing device 132 which decodes and reproduces a stream received by the stream transfer device 20; and a display device 133 which performs display and audio output of multimedia data decoded and reproduced by the decoding and reproducing device 132.

The stream transfer in the system of FIG. 1 adopts, for example, UDP (User Datagram Protocol)/IP (Internet Protocol).

Figure 2:
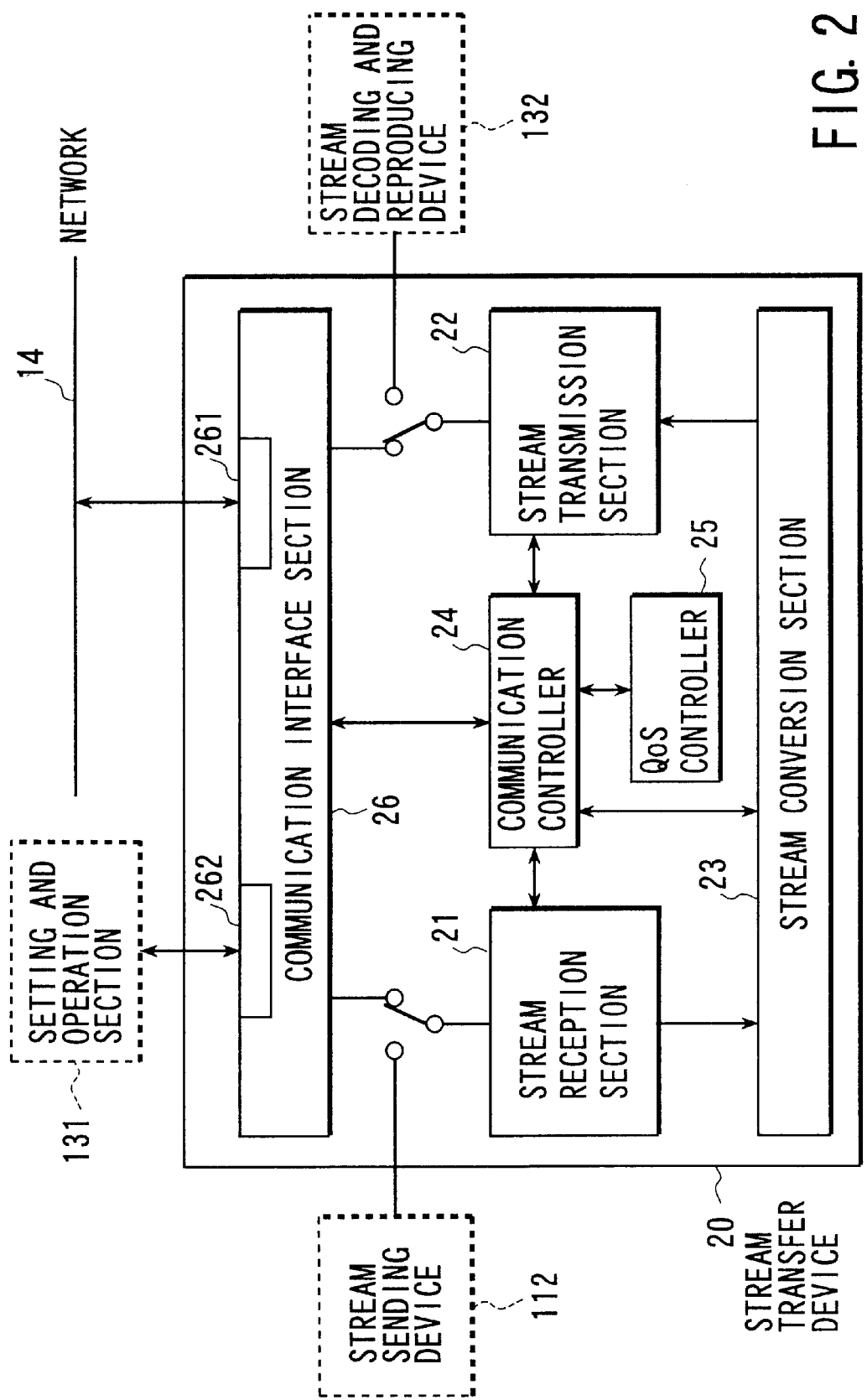
FIG. 2 is a block diagram showing a structure of a stream transfer device 20 of FIG. 1.

FIG. 2 is a block diagram showing a structure of a stream transfer device 20.

The stream transfer device 20 comprises: a stream reception section 21; a stream transmission section 22; a stream conversion section 23; a communication controller 24; a QoS controller 25; and a communication interface section 26.

The stream reception section 21 in the stream transfer device 20 provided in the transmission node 11 is connected with the stream sending device 112 which can be controlled by the stream transfer device 20. The stream reception section 21 receives a stream sent out from the stream sending device 112 and outputs the stream to the stream conversion section 23.

On the other hand, the stream reception sections 21 in the stream transfer devices 20 equipped in the relay node 12 and the reception node 13 are connected to the network 14 through the transmission interface sections 26. A stream reception section 21 receives a stream transferred from the upstream side with UDP through the network 14 and outputs the stream to the stream conversion section 23 in the same stream transfer device 20. The stream reception section 21 has a data reception results notification function (internal state notification function) which measures a data reception volume per unit time and notices the measured value, for example, to the QoS controller 25 in the reception node 13 through the communication controller 24 as a QoS state message regarding a effective reception rate (data reception results).

The stream transmission sections 22 in the respective stream transfer devices 20 equipped in the transmission node 11 and the relay node 12 are connected to the network 14 through the communication interface sections 26 in the same stream transfer devices 20. A stream transmission section 22 transmits a stream sent from the stream conversion section 23 in the same stream transfer device 20 with UDP (by way of the communication interface section 26) to the network 14.

On the other hand, the stream transmission section 22 in the steam transfer device 20 equipped in the reception node 13 is connected to the stream decoding and reproducing device 132 which can be controlled by the stream transfer device 20. The stream transmission section 22 receives a stream received by the stream reception section 21 in the same stream transfer device 20 through the stream conversion section 23 and outputs the stream to the stream decoding and reproducing device 132. The stream reception section 22 has a data processing results notification function (internal state notification function) in which the reception section 22 calculates a ratio of a processing data volume to a reception data volume and performs normalization processing, and notifies the normalized result to, for example, the QoS controller 25 in the same reception node 13 as a QoS state message regarding data processing results.

The stream conversion sections 23 in the stream transfer devices 20 equipped in the transmission node 11 and the relay node 12 each have a function (stream shaping function) in which a stream conversion section 23 receives a stream received by the stream reception section 21 to performs a stream analysis and send out the stream to the stream transmission section 22 adjusting a sending data volume. There will later be described details of the stream shaping function which the stream conversion section 23 has.

On the other hand, the stream conversion section 23 in the steam transfer device 20 equipped in the reception node 13 receives a stream received by the stream reception section 21 and sends out the stream to the stream transmission section: 22 as it is.

The communication controller 24 is connected to the stream reception 21, the steam reception section 22, a stream conversion section 23, the QoS controller 25 and a communication interface section 26. The communication controller 24 has a parameter setting function which performs QoS parameter settings, described later, for, mainly, the stream reception section 21, the stream transmission section 22 and the stream conversion section 23 and an internal state retrieval function which retrieves internal states (numeral values measured by the sections, whether or not a trouble arise) of the stream reception section 21, the stream transmission section 22 and the stream conversion section 23.

The QoS controller 25 automatically controls a QoS parameter which relates to a stream transfer according to a load state of a network (load state of a link between a node on which data transmission and reception are performed) and load states of the nodes (transmission/relay/reception nodes). This is called as QoS control (QoS automatic control). A load state of a link (network) is to be determined by data reception results at a node in the downstream side from the link and a load state of a node is to be determined by data processing results at the node. While a delay, jitter, a packet loss factor, a transfer band. and the like are considered as a QoS parameter, a transmission rate (=transfer band) is adopted in the embodiment.

The communication interface section 26 comprises: an interface (network interface) 261 with the network 14, and a connection interface 262 with a setting and operation section 131.

In the system of FIG. 1, a centralized Qos management scheme or a distributed management scheme is adopted as a management scheme for QoS control. The centralized QoS management scheme is a scheme in which a QoS controller 25 provided in the stream transfer device 20 of one of the nodes in the system collects information regarding load states of the links and load states of the nodes in the system and determines respective optimal QoS parameters for the nodes based on collection results, whereby QoS controller 25 performs setting update of the QoS parameter of each node. On the other hand, the distributed QoS management scheme is a system in which each of nodes having links with an upstream side node collects information regarding load states of the links and a load state of itself (self node) and determines a optimal QoS parameter for the upstream side node based on the collection results, whereby each node performs setting update of a QoS parameter of the upstream side node.

Figure 3:
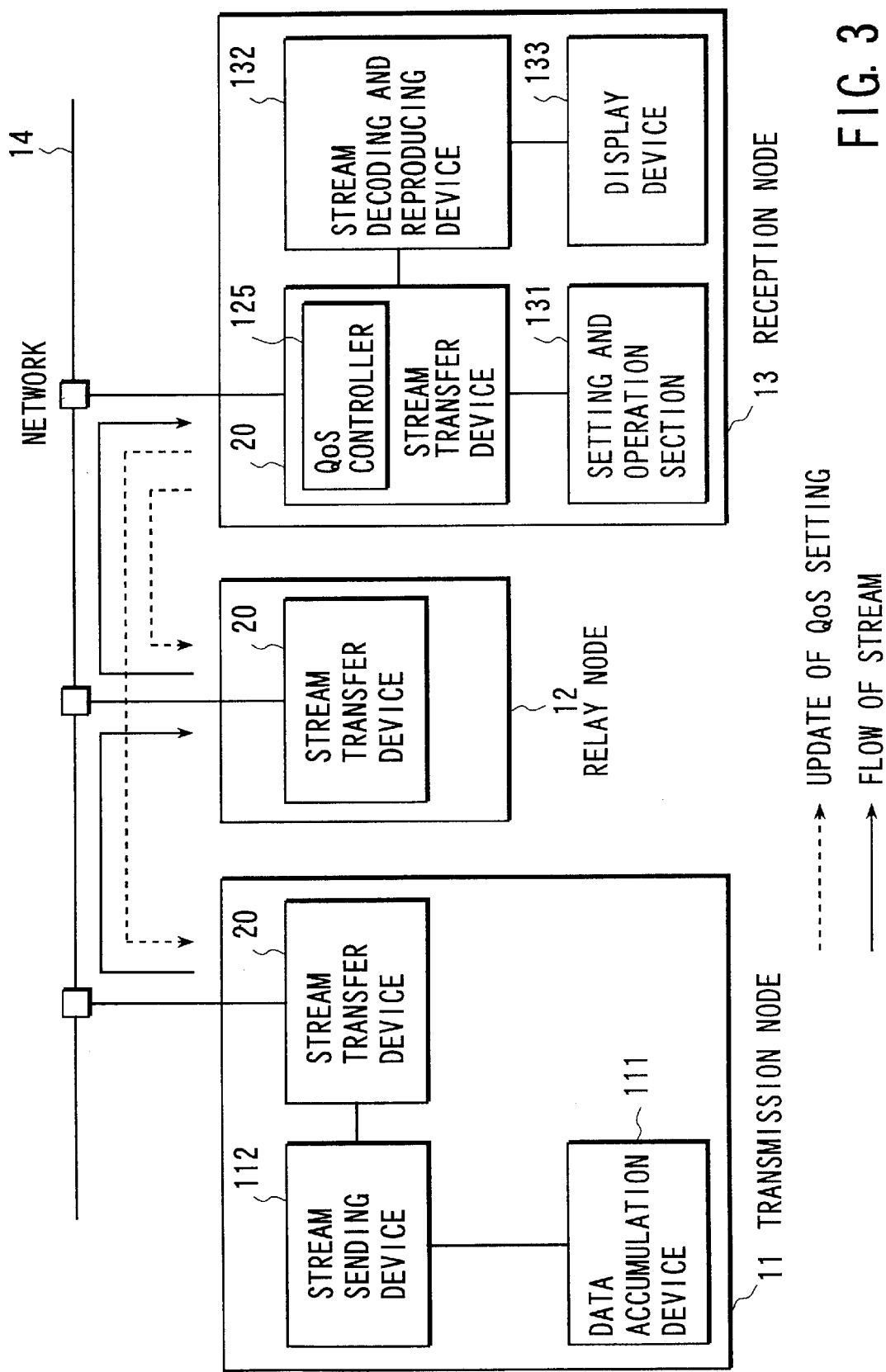
FIG. 3 is a block diagram showing an example of application in which a centralized QoS management scheme is applied in the system of FIG. 1.

FIG. 3 shows an example in which a centralized QoS management scheme is applied in the system of FIG. 1 The application example shows the case in which the QoS controller 25 provided in the stream transfer device 20 in the reception node 13 performs QoS management for each of nodes in the system in a centralized manner.

In FIG. 3, the QoS controller 25 provided in the stream transfer device 20 in the reception node 13 collects information regarding a load state of a link between the transmission node 11 and the relay node 12, a load state of a link between the relay node 12 and the reception node 13, and load state of each of the relay node 12 and the reception node. The QoS controller 25 determines optimal parameters for the nodes 11, 12 respectively based on the collection results, whereby QoS controller 25 performs setting update of the a QoS parameter for the stream conversion sections 23 (provided in the stream transfer devices 20) in the nodes 11, 12.

In the embodiment, the information regarding the load state of the link between the transmission node 11 and the relay node 12 is data reception results of the stream reception section 21 provided in the stream transfer device 20 in the relay node 12. The information regarding the load state of the link between the relay node 12 and the reception node 13 is data reception results of the stream reception section 21 provided in the stream transfer device 20 in the reception node 13. On the other hand, the information regarding the load state of the relay node 12 is data processing results of the stream transmission section 22 provided in the stream transfer device 20 in the relay node 12 (the information may be data processing results of the stream conversion section 23 instead). Information regarding a load state of the reception node 13 is data processing results of the stream decoding and reproducing section 132 in the reception section 13.

Therefore, the relay node 12 and the reception node 13 are called as monitoring target nodes. The stream reception sections 21 (provided in the stream transfer devices 20) in the nodes 12, 13, the stream transmission section 22 (provided in the stream transfer device 20) in the relay node 12 and the stream decoding and reproducing device 132 in the reception node 13 are called monitoring target modules. The stream conversion sections 23 (provided in the stream transfer devices 20) in the nodes 11, 12 which are targets for setting update of a QoS parameter each is called a control target (QoS control target) module. The nodes 11, 12 each are called a control target (QoS control target) node. The reception node 13 having the QoS controller which performs setting update of a QoS parameter is called as a management node, FIG. 4 is a block diagram showing a structure of the QoS controller 25 when the QoS controller 25 has a centralized QoS management function.

Figure 4:
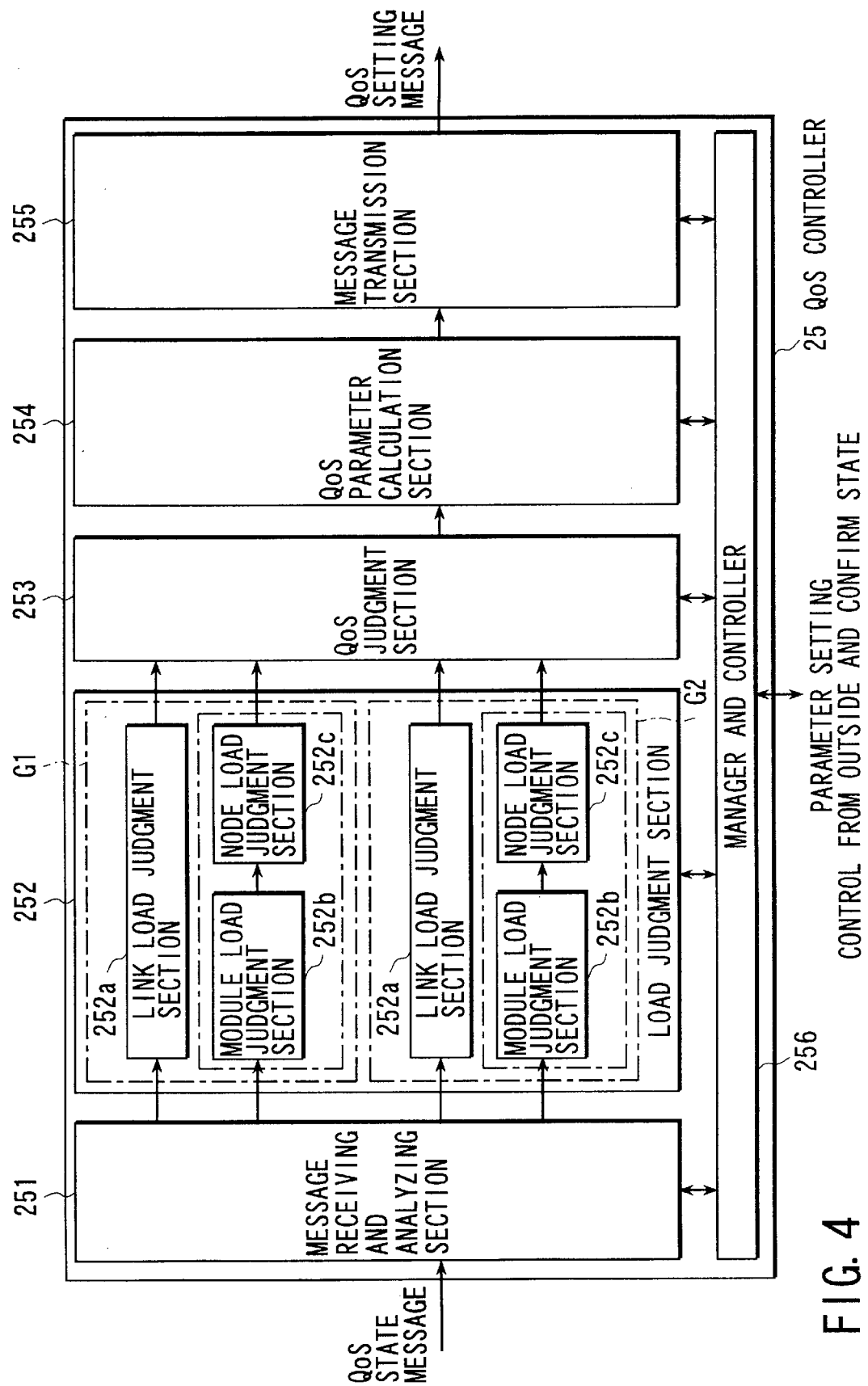
FIG. 4 is a block diagram showing a structure of a QoS controller 25 having a centralized QoS management function.

The QoS controller 25 of FIG. 4 comprises: a message receiving and analyzing section 251; a load judgment section 252; a QoS judgment section 253, QoS parameter calculation section 254, a message transmission section 255 and a manager and controller 256.

The message receiving and analyzing section 251 analyzes QoS state messages sent from the modules of a self node (here the reception node 13) and other nodes (here the transmission node 11 and the relay node 12) receiving the state messages through the communication controller 24 and selectively outputs the messages to proper processing sections.

The QoS state messages are messages for notification of internal states of the stream transfer devices 20 of the nodes and the like. QoS messages adopted in the embodiment include a data reception results notification message, a data processing results notification message, a QoS parameter notification message, a transition state notification message (transition state starting/end notification message), a trouble informative message and the like.

The data reception results notification message is a QoS state message for notification of data reception results (effective reception rate) sent from a monitoring target module (the stream reception section 21 which each stream transfer device 20 in the relay node 12 and the reception node 13 has) which measures data reception results.

The data processing results notification message is a QoS state message for notification of data processing results sent from a monitoring target module (the stream transmission section 22 which the stream transfer device 20 in the relay node 12 has and the stream decoding and reproducing device 132 in the reception node 13) which measures data processing results.

The QoS parameter notification message is a QoS state message for notification of a set value of a QoS parameter (=a transmission rate) sent from a QoS control target module (the stream conversion section 23 in the stream transfer device 20) of a QoS control target node (the transmission node 11 and the relay node 12).

The transition state notification message is a QoS state message for notification of starting/end of QoS parameter (transmission rate) update processing which is performed at a QoS control target module of a QoS control target node according to a QoS setting message, described later, from the message transmission section 255 from the QoS control target module.

The trouble informative message is a QoS state message for notification of a trouble sent from a module which falls in a state in which stream transfer cannot be maintained.

The data reception results notification message and the data processing results notification message are transferred to a load judgment section 252. The QoS parameter notification message, the transition state notification message and the trouble informative message are transferred to the manager and controller 256.

The load judgment section 252 comprises: a link load judgment section 252a provided for each node (monitoring target node) to which a monitoring target module relating to data reception results belongs, a module load judgment section 252b provided for each monitoring target module relating to data processing results and a node load judgment section 252c provided for each monitoring target node. The link load judgment section 252a, the module load judgment section 252b and the node load judgment section 252c are functional components which are realized by use of a software program and created by the manager and controller 256 in necessary number in a proper fashion according to a node structure of a stream communication system, a purpose of QoS control and the like.

The link load judgment section 252a receives data reception results notification message from a corresponding monitoring target node (the stream reception section 21 which the stream transfer device 20 in the monitoring target node) from the message receiving and analyzing section 251. A load of a link between the node and a node on the upstream side is judged based on data reception results which the message shows. Accordingly, when the corresponding monitoring target node is the relay node, the link between the transmission node 11 and the relay node 12 is judged. When the corresponding monitoring target node is the reception node 13, the link between the relay node 12 and the reception node 13 is judged. At least one link load judgment section 252a (the number of links is maximal) is provided (created). In the embodiment, there are provided the link load judgment section 252a corresponding to the relay node 12 and the link load judgment section 252a corresponding to the reception node 13, which is two in total number. A link load judgment result of the link load judgment section 252a is output to the QoS judgment section 253 in three levels including, for example High (H): Load Large (LL=2)/ Medium (M): Load Proper (LL=1)/Low (L): Load Small (LL=0).

The module load judgment section 252b receives a data processing results notification message (QoS state message) from a node (monitoring target node) which has a corresponding monitoring target module, from the message receiving and analyzing section 251 and judges a load of the module based on the data processing results which the message shows. One or more module load judgment sections 252b are provided (created) at a rate of at least one (the number of components which can calculate data processing results is maximal) section per one node. In the embodiment, a monitoring target module which belongs to the relay node 12 as a monitoring target node is the stream transmission section 22 (in the stream transfer device 20) and a monitoring target module which belongs to the reception node 13 as another monitoring target node is the stream decoding and reproducing device 132. Accordingly, there are provided the module load judgment section 252b corresponding to the stream transmission section 22 (monitoring target module) which belongs to the relay node 12 and the module load judgment section 252b corresponding to the stream decoding and reproducing device 132 (monitoring target module) which belongs to the reception node 13.

The node load judgment section 252c integrates load judgment results of the module load judgment section 252b regarding all monitoring target modules which belong to a corresponding monitoring target node and judges a load of the node. At least one node load judgment section 252c (the number of nodes in a system is maximal) is provided (created). In the embodiment, there are provided the node load judgment section 252c corresponding to the relay node12 and the node load judgment section 252c corresponding to the reception node 13, which is two in total number. A node judgment result of the node load judgment section 252c is output to the QoS judgment section 253, for example, in three levels of Load Large (H)/Load Proper (M)/Load Small (L), as in the case of the link load judgment result.

The link load judgment sections 252a, the module load judgment sections 252b and the node load judgment sections 252c in the load judgment section 252 are divided into groups to which control target nodes belong respectively. In the embodiment, control target nodes are the transmission node 11 and the relay node 12, which is two in total number. Accordingly, the load judgment section 252 is managed being divided into a group G1 corresponding to the transmission node 11 and a group G2 corresponding to the relay node 12. The group G1 comprises: the link load judgment section 252a corresponding to the relay node 12 (monitoring target node) on the downstream side from the transmission node 11; the module load judgment section 252b corresponding to a monitoring target module (the stream transmission section 22 in the relay node 12) which belongs to the relay node 12 (monitoring target node); and the node load judgment section 252c corresponding the relay node 12 (monitoring target node). The group G2 comprises: the link load judgment section 252a corresponding to the reception node 13 (monitoring target node) on the downstream side from the relay node 12; the module load judgment section 252b corresponding to a monitoring target module (the stream decoding and reproducing device 132 in the reception node 13); and the node load judgment section 252c corresponding to the reception node 13 (monitoring target node).

The QoS judgment section 253 stores load judgment results sequentially sent from each link load judgment section 25a and each node load judgment section 252c during stream transfer in a table. The QoS judgment section 253 performs QoS judgment for each group (that is in control target nodes each as a unite for judgment) while combining link load judgment results and node load judgment results in the same group. A QoS judgment result in the embodiment also works as control information on a transmission rate (QoS parameter) and is output in three levels of UP/HEEP/DOWN.

When a judgment result of the QoS judgment section 253 is UP or DOWN, the QoS parameter calculation section 254 recalculates a QoS parameter (a specified transmission rate of the transmission node). and notifies it to the message transmission section 255. When a transmission rate which is shown by the calculated QoS parameter is less than a lower bound limit (a minimum transmission rate) of a specified transmission rate control range, the QoS parameter calculation section 254 sets a flag (rate deduction flag) which indicates the fact to ON. The flag is stored in the manager and controller 256.

The message transmission section 255 receives a QoS parameter (specified transmission rate) calculated by the QoS parameter calculation section 254 and creates a QoS setting message which requests setting change of a QoS parameter. The message transmission section 255 transmits the message to a control target (QoS control target) node (through the communication controller 24). When the message transmission section 255 receives trouble notification from the manager and controller 256 according to trouble informative message which is given to the manager and controller 256 from the message receiving and analyzing section 251, the message transmission section 255 transmits a message requesting stoppage of the entire stream transfer system (system stop message). When the message transmission section 255 receives interruption notification of stream transfer from the manager and controller 256, the message transmission section 255 transmits a message requesting interruption of stream transfer (stream transfer interruption message).

The manager and controller 256 performs various kinds of setting for QoS control according to, for example, an application program (hereafter simply referred to as application) or according to a user specification. Setting items for QoS control includes: the number of nodes (the number of links=the number of nodes−1) showing a node structure of a stream transfer system; a module structure of each node; ON/OFF setting in node load judgment on each node (a judgment target of a node load, that is whether or not a node is selected as a monitoring target for a node load); ON/OFF setting in link load judgment on each link; setting of a QoS control target node and a QoS control target module; and the like. The number of nodes and module structures of respective modes can automatically be set being automatically acquired, the number and the structure being acquired from a master device (a stream master) in the system, when there is provided the master device which manages all the stream transfer systems.

Setting items for QoS control further includes: a content rate of a stream as a transfer target; a minimum transmission rate and a maximum transmission rate showing a control rage of a transmission rate (rate control range); and interruption/continuation modes. When a transmission rate shown by a QoS parameter calculated by the QoS parameter calculation section 254 is lower than a specified minimum transmission rate, a stream transfer is interrupted assuming the interruption mode or continued at the minimum transmission rate assuming the continuation mode.

The rate control range and the interruption/continuation modes (control modes) are set, for example, by user specification prior to stream transfer starting, when the upper bound limit (the maximum transmission rate) of the specified control range is higher than a content rate, the upper bound limit is set to the content rate. In the case of (the manager and controller 256 of) the QoS control section 25 which is provided with a setting and operation section 131, as in the reception node 13 of the embodiment, specification of the rate control range and the interruption/continuation modes is by the setting and operation section 131. The specification can also be achieved by use of a QoS state message.

The manager and controller 256 analyzes a message receiving from the message receiving and analyzing section 251 which message is transmitted from a control target module, acquires a set value of a QoS parameter (which is set at a control target module according to a QoS setting message from the message transmission section 255) and monitors QoS control state and a transition state (a transition state from transmission of a QoS setting message till setting change of a QoS parameter is effective).

Messages handled by the manager and controller 256 include the following messages: a QoS parameter notification message which notifies a set value of a QoS parameter as described above; a transition state notification message which notifies starting/end of a transition state; and a trouble informative message which is notified from a module which falls in a state that stream transfer cannot be maintained. Each of the messages are attached with a identifier showing a transmitter of the message.

When a set value of a QoS parameter is extracted from a QoS parameter notification message, the manager and controller 256 stores the QoS parameter (a specified transmission rate at the steam conversion 23 of a message transmitter) and notifies it to the QoS judgment section 253.

When the manager and controller 256 receives a transition state notification message, the manager and controller 256 updates a transition state flag managing a transition state (and a steady state) according to a content of the message. When the manager and controller 256 receives a trouble informative message, the manager and controller 256 performs error processing and makes the message transmission section 255 transmit a system stop message.

In addition, when a rate deduction flag is set to ON by the QoS parameter calculation section 254 in a state where a interruption mode is set, the manager and controller 256 makes the message transmission section 255 transmit a stream transfer interruption message instead of a QoS parameter setting message.

Then, there will be described operation of the Qos controller 25 (in the steam transfer device 20) during stream transfer in reference to a flow chart of FIG. 5.

Figure 5:
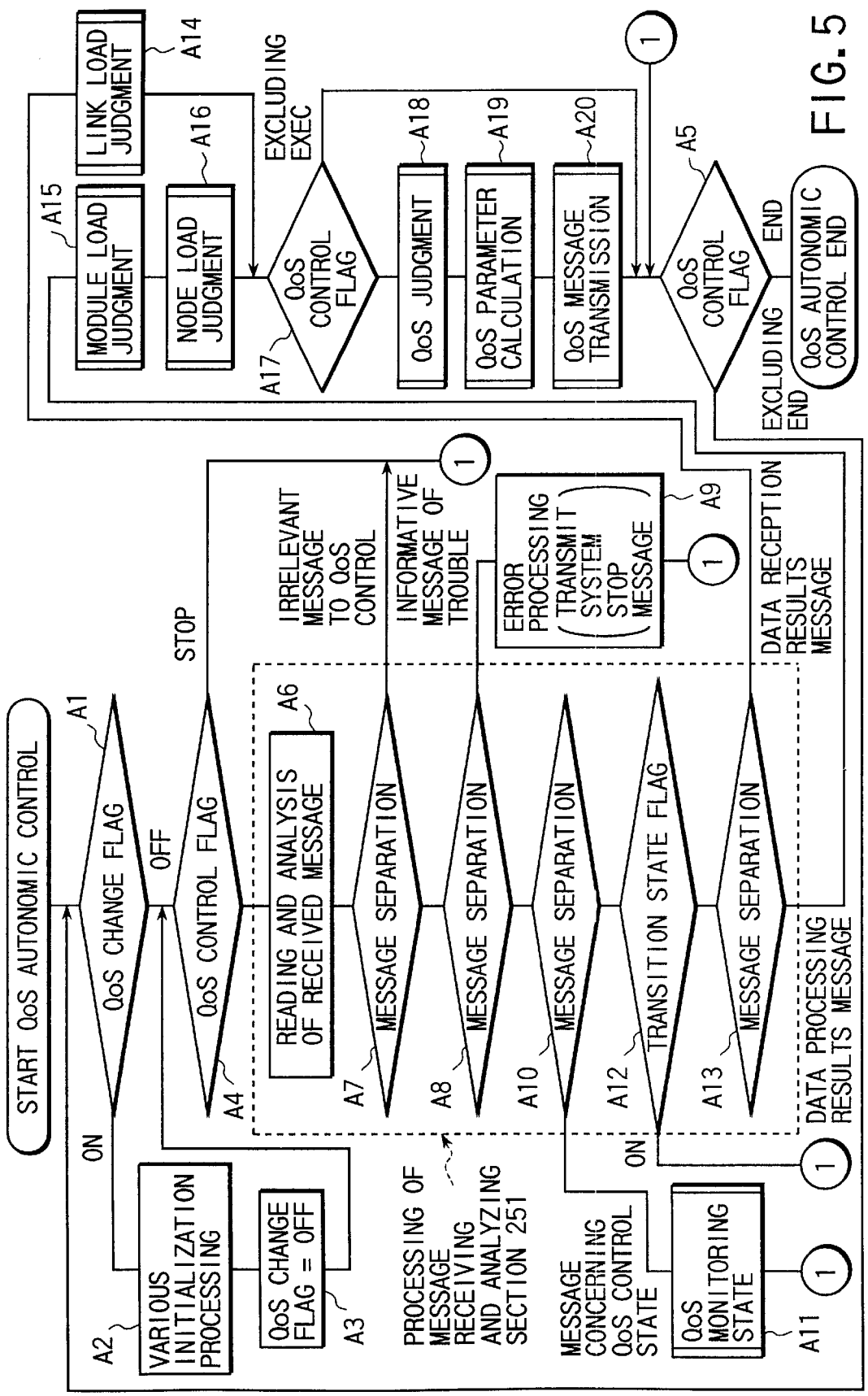
FIG. 5 is a flow chart for illustration of operation of the QoS controller 25 during stream transfer.

The QoS control section 25 automatically operates following the flow chart of FIG. 5 during stream transfer.

(The manager and controller 256 in) the QoS control section 25 has a flag (QoS control flag) indicating a state of QoS control and a flag (QoS change flag) indicating whether or not a QoS setting condition is changed from outside. When the QoS change flag is ON (step Al), the QoS control section 25 performs initialization processing regarding various initial setting items and the flag is set to OFF (step A2, A3).

When the QoS control section 25 judges at step A1 that a QoS control flag is in the OFF state, the QoS control section 25 checks a QoS flag control state (step A4). When the QoS control section 25 judges at step A1 that the QoS control flag in the ON state, the QoS control section 25 checks a QoS control flag state (step A4) after execution of steps A2, A3.

There are available four kinds of a QoS control flag state, which are: [EXEC] instructing execution of QoS control; [PAUSE] instructing a pause of QoS control; [END] instructing a stop of QoS control; and [STOP] instructing a stop of stream transfer, which is four in total number.

When the QoS control flag is in a state other than [STOP], the manager and controller 256 activates the message receiving and analyzing section 251. The message receiving and analyzing section 251 has a queue structure buffer (hereinafter referred to as "queue") which receives a QoS state message sent from the self node and a monitoring target module of another node through the communication control section 24 and stores the messages in the order of reception. The message receiving and analyzing section 251 reads QoS state messages from a queue in the order of reception and performs message analysis processing described below.

The QoS state message includes a QoS message character string, a node address of a message transmitter, a module identifier of the message transmitter. The message receiving and analyzing section 251 refers to information of the kinds, analyzes a kind of the message (step A6) and directs the message to a proper processing section.

When a QoS state message is a message having no relation to QoS control (step A7), the message receiving and analyzing section 251 makes program flow go to step A5 while neglecting the message.

On the other hand, when a QoS state message is a message having a relation to QoS control, and the message is a trouble informative message (step A8), the message is transferred to the manager and controller 256. Then, error processing (transmission of a system stop message from the message transmission section 255) by the manager and controller 256 is performed (step A9) and program flow goes to step A5.

When a QoS state message is a message relating to QoS control and the message is a message relating to a QoS control state (QoS parameter notification message and transition state notification message) (step A10), the message is transferred to the manager and controller 256. Then, QoS state monitoring processing is performed (step A11) and program flow goes to step A5.

When a QoS message is neither trouble informative message nor a message relating to a QoS control state, a state of a transition state flag (ON/OFF) is checked (step A12). When a flag is in the ON state (transition state) (step A12), the message is annulled and program flow goes to step A5 without performing neither load judgment nor QoS judgment. In the embodiment, a state from when a QoS parameter setting message which requests setting change of a QoS parameter is transmitted till the change becomes effective is assumed to be in a transition state. Messages in connection with starting/end of a transition state are handled in QoS state monitoring processing (step A11) in the manager and controller 256 and a transition state flag is set. This message is a message to prevent transmitting a new QoS parameter change request while updating a QoS parameter. The QoS control becomes a state of a temporary stop in a period from the reception of the transition state starting message to the reception of the transition state end message.

On the other hand, when a transition state flag is in the OFF state (step A12), it is checked whether a message relating to QoS control is a data reception results notification message or a data processing results notification message (step A13).

When the message is a data reception results notification message, the message is transferred to the link load judgment section 252a and link load judgment processing, described later, based on data reception result values in character string of the message (step A14). A link judgment result of the link load judgment section 252a is transferred to the QoS judgment section 253.

When the message is a data processing results notification message, the message is transferred to the module load judgment section 252b and module load judgment processing, described later, is performed based on a data processing result value in a character string of the message (step A15). A module load judgment result of the module load judgment section 252b is transferred to the node load judgment section 252c which performs load judgment of a node to which a corresponding module belongs. The node load judgment section 252c integrates module load judgment results of all module load judgment section 252b regarding a monitoring target module which belongs to the same node (monitoring target node) determined in advance and node load judgment processing, described later, regarding the node is performed (step A16). A node load judgment result of the node load judgment section 252c is transferred to the QoS judgment section 253.

When a step A15 and step A16 are executed, the manager and controller 256 again checks a QoS control flag state (step A17) and as a result, if the state is a state excluding [EXEC], program goes to step A5. On the other hand, when a state is in the [EXEC] state, the manager and controller 256 activates the QoS judgment section 253. Thereby, the QoS judgment section 253 performs QoS judgment processing, described later, which determines a QoS control policy based on a link load judgment result of the link load judgment section 252a and a node load judgment result of the node load judgment section 252c (step A19). A QoS judgment result (which is indicated in three levels of UP/KEEP/DOWN) of the QoS judgment section 253 is transferred to the QoS parameter calculation section 254.

When a QoS judgment result of the QoS judgment section 253 is UP or DOWN, the QoS parameter calculation section 254 performs QoS parameter calculation processing, described later, for recalculation of a QoS parameter (transmission rate) (step S19). When there is a change in a QoS parameter as a result of the recalculation in the QoS parameter calculation section 254, the recalculation result is transferred to the message transmission section 255. The message transmission section 255 receives the recalculation result of the QoS parameter calculation section 254, creates a QoS parameter change request message (QoS setting message) and transmits the message to a node to which a QoS control target module belongs through the communication control section 24 (step A20). Then, program flow goes to step A5.

The manager and controller 256 checks a state of a QoS control flag at step A5. If the QoS control flag assumes a state other than [END], processing from the step A1 through the following steps thereof is repeated and if [END] is assumed, a series of QoS control is terminated.

Then, there will be described QoS state monitoring processing of step A11 by the manager and controller 256 in reference to a flow chart of FIG. 6.

The manager and controller 256 analyzes a message transmitted from a QoS control target module and judges a kind of message (step B1). If the transmission message does not have a predetermined format, the manager and controller 256 judges the message as format error and terminates the QoS state monitoring processing (step A11).

On the other hand, if the transmission message is a transition state notification message to notify starting/end of a transition state, that is a transition state starting notification message to notify that QoS parameter change processing is started, or a transition state end notification message to notify that QoS parameter change processing is terminated, the manager and controller 256 updates a transition state flag according to the message (step B2).

Then, the QoS controller 25 checks the transition flag after the update (step B3) and if the transition state flag is in the state of OFF, that is a transition state is finished, necessary initialization (initialization of a table or like, described later, to hold a load judgment result) is executed in order to enable restarting of QoS control which is temporarily stopped (step B4) and the QoS state monitoring processing is terminated.

If the transmission message is a QoS parameter notification message to notify a set value of a QoS parameter (a transmission rate), the manager and controller 256 updates a set value of the QoS parameter which has been set and is currently held by itself (in corresponding manner to a transmitter of the message) to a latest set value of the QoS parameter which has been notified (step B5) and terminates the QoS state monitoring processing. The set value of the QoS parameter, that is a set transmission rate at a QoS control target module is used for determination of a judgment standard (upper bound and lower bound thresholds of permissible reception rate, described later) at the link load judgment section 252a and in addition, when a QoS parameter change request, which a QoS setting message from the message transmission section 255 specifies, is received, it is used to judge whether or not a QoS parameter has actually been changed as well.

Figure 7:
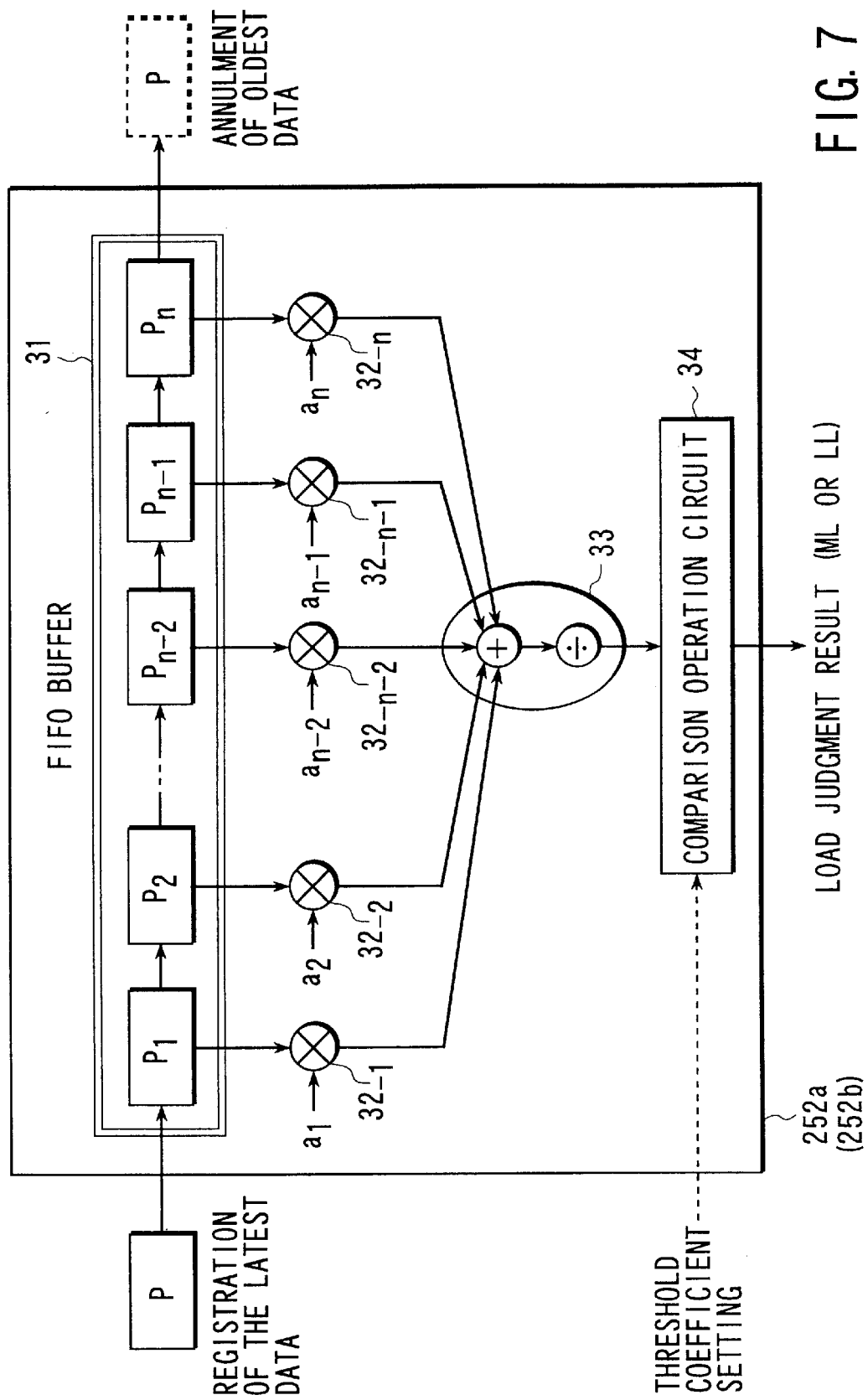
FIG. 7 is a block diagram showing a structure of a link load judgment section 252a and a module load judgment section 252b.

The link load judgment section 252a, as shown in FIG. 7, comprises: a FIFO (first-in, first-out) buffer 31 with n stages which has a table structure of a size 1×n in order to hold n data reception results, in the order of a time series, extracted from a QoS state message (by the message receiving and analyzing section 251); weighting circuits 32-1 to 32-n which modifies n data reception results held in the FIFO buffer 31 with weights al to an determined by the time series order; an operation circuit 33 in which a sum of outputs from the weighting circuits 32-1 to 32-n is divided by a sum of weights; and a comparison operation circuit 34 in which an operation result of the operation circuit 33, that is a value that is obtained by dividing the sum of latest n weighted data reception results by the sum of weights (average effective reception rate) is compared with link judgment thresholds (the upper bound and lower bound thresholds of a permissible reception rate) and thereby a link load judgment result (LL) is output in three levels including, for example High (H): Load Large (LL=2)/Medium (M): Load Proper (LL=1)/Low (L): Load Small (LL=0).

Figure 8:
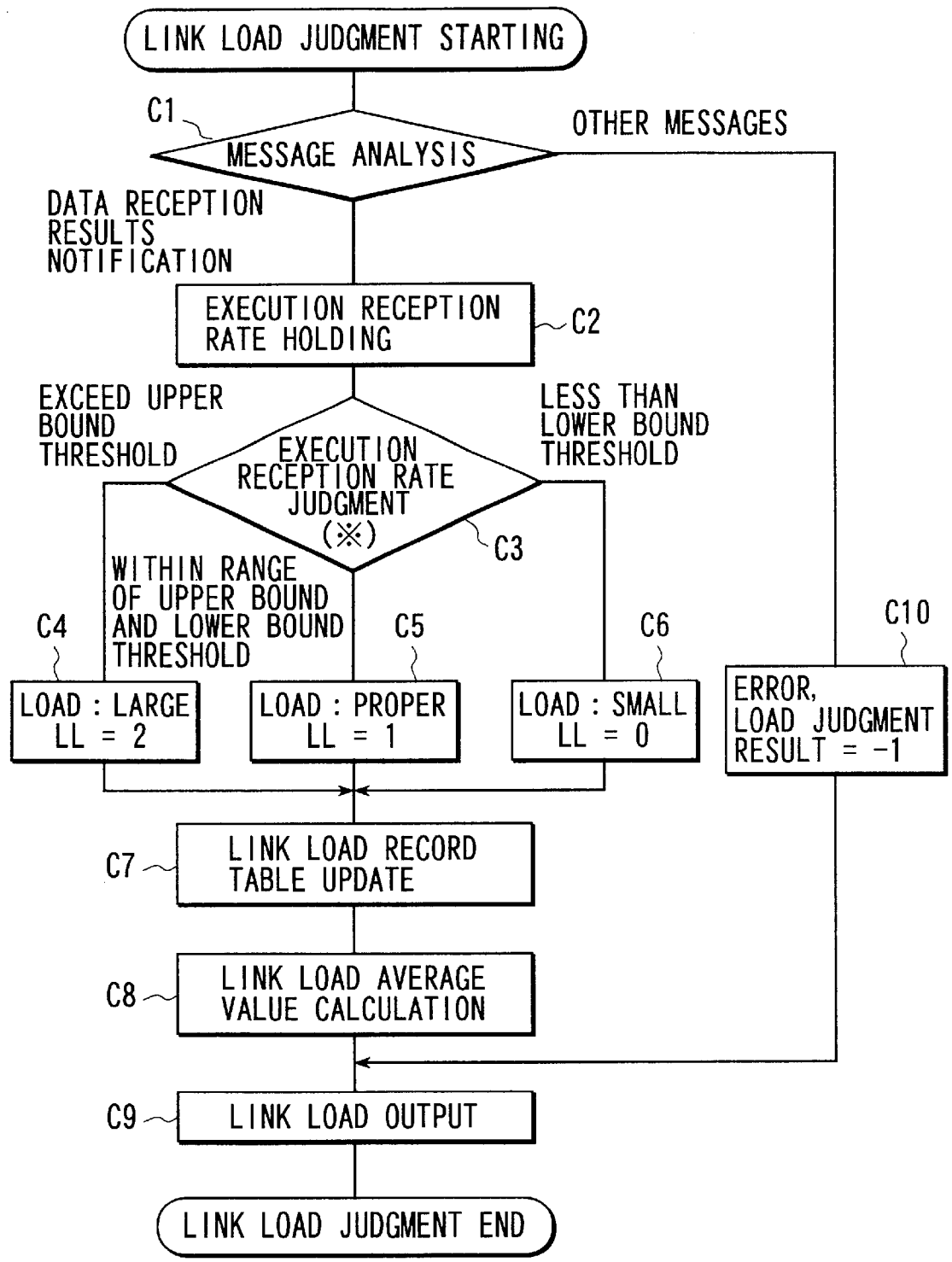

Then, there will be described link load judgment processing of step A14 by the link load judgment section 252a in reference to a flow chart of FIG. 8.

When a message given from the message receiving and analyzing section 251 is a message to notify data processing results (step C1), the link load judgment section 252a stores the effective reception rate in the FIFO buffer 31 (step C2). At this time, when n data reception rates (effective data reception result) are already stored in the FIFO buffer 31, the oldest effective reception rate is annulled. In the embodiment, time intervals of data reception results notification messages are not constant and each time when a message is notified, load judgment described below is performed.

It is assumed, at this time, that n latest effective reception rates P1 to Pn are held in the FIFO buffer 31. There are input a value which is obtained by dividing a sum of values weighted using weights al to an, (weighted sum) a1·P1 to an·Pn by a sum of weight (factors), al to an, that is an average effective reception rate in the comparison operation circuit 34 in the link load judgment section 252a.

At this point, when it is assumed that all of al to an are 1, there is input a simple mean value of the latest n effective reception rates P1 to Pn in the comparison operation circuit 34. It may be no problem that a later effective reception rate Pi (i=1 to n) is modified by a increased weight ai. Besides, it may also be no problem that al is set to 1, but a2 to an are set to 0 and thereby only a latest P1 is adopted. Furthermore, if weights al to an are set such that a sum (Σai)=1, a weighted sum a1·P1+. . . + an·Pn (Σai·Pi) shows an average effective reception rate, whereby division operation at the operation circuit 34 is not required.

The comparison operation circuit 34 compares the average effective reception rate with the upper bound and lower bound thresholds of a permissible reception rate (step C3). At this point, when it is assumed that the transmission rate is R, the upper bound threshold is set at R(1+α) and the lower bound threshold is set at R(1−α). The α is a constant indicating a stable range of a reception rate and a default value of the order of 0.05 to 0.1 is defined.

When an effective reception rate exceeds the upper bound threshold value, the comparison operation circuit 34 set a judgment result to [H: Load Large (LL=2)] (step C4). When an effective reception rate is within a threshold range (equal to or larger than the lower bound threshold and equal to or smaller than the upper bound threshold), a judgment result is set to [M: Load Proper (LL=1)] (step C5) and when an effective reception rate is smaller than the lower bound threshold, a judgment result is set to [L: Load Small (LL=0)] (step C6).

Figures 6, 9:
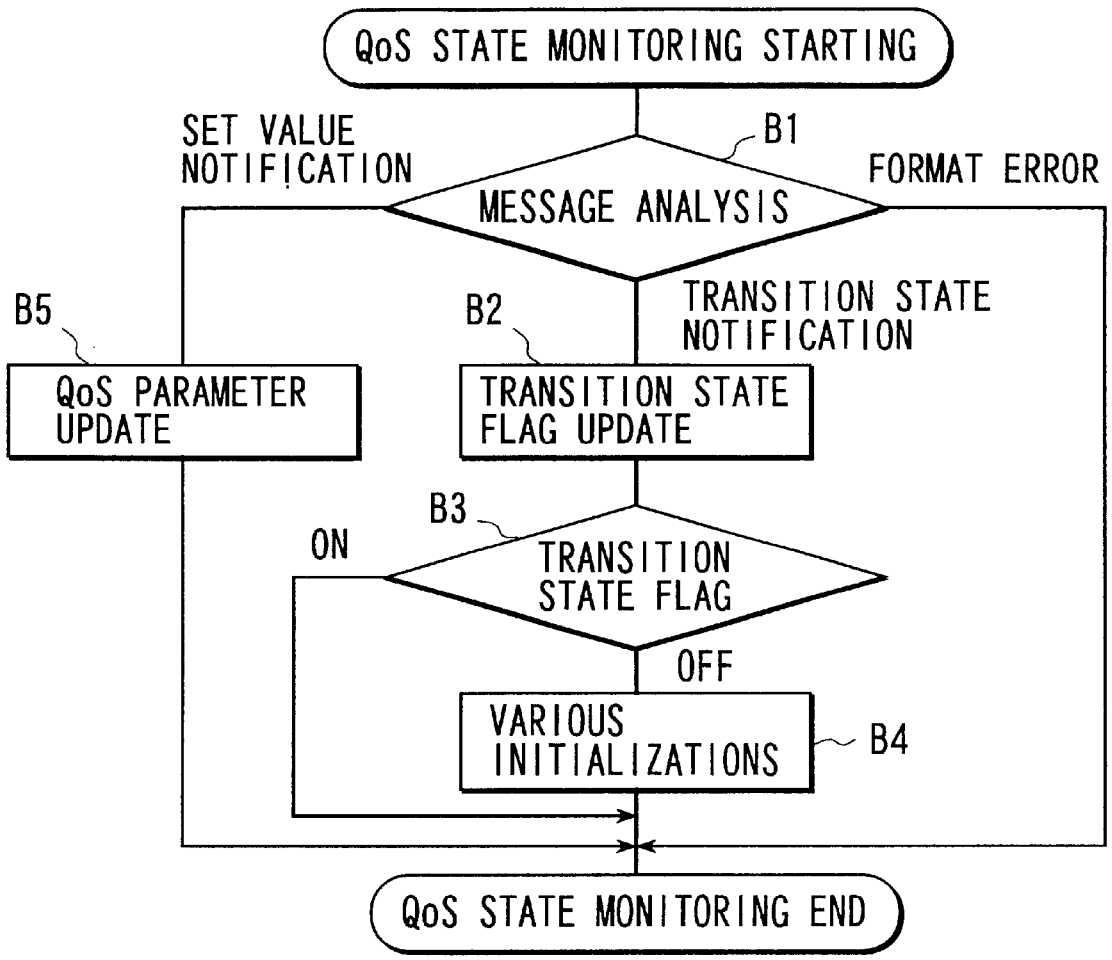

In the embodiment, a change of a link load over time is considered for QoS judgment and therefore, there is ready in stock a FIFO type link load record table 40, for example shown in FIG. 9, in order to store the maximum N (herein N=10) of latest judgment results of a link load output from the comparison operation circuit 34. Judgment results at the comparison operation circuit 34 are stored in the link load record table 40 of FIG. 9 (step C7). After the N judgment results are stored in the table 40., each time when one new judgment result gets stored, the oldest judgment result at the point in time is annulled.

The link load judgment section 252a calculates an average value (a number is round off to an integer) of latest N1 judgment results (N1≦N, wherein N1=5 and corresponds to hatched portions of FIG. 9) in the link load record table 40 (step C8). The link load judgment section 252a outputs a calculated average as a final link load judgment result (link load) LL to the QoS judgment section 253 in combination with a module identifier of a monitoring target module (step C9). The final judgment result LL, however, is not handled as a registration target to the table.

When a reception message is not correct, it is judged as an error and a load judgment result LL is set to −1 (step C10).

The module load judgment section 252b has a structure similar to the link load judgment section 252a. Therefore, there is described a structure of the module load judgment section 252b adopting FIG. 7. The module load judgment section 252b comprises: a FIFO buffer 31 with n stages which has a table structure of a size 1×n in order to store n data processing results, in the order of a time series, extracted from a QoS state message (by the message receiving and analyzing section 251); weighting circuits 32-1 to 32-n which modifies n data processing results stored in the FIFO buffer 31 with weights determined by the time series order; an operation circuit 33 in which a value (an average effective reception rate) is obtained by dividing a sum of outputs from the weighting circuits 32-1 to 32-n by a sum of weights; and a comparison operation circuit 34 in which an operation result of the operation circuit 33 is compared with module load judgment thresholds (the upper bound and lower bound thresholds of a permissible processing result) and thereby a module load judgment result (module load) ML is outputs in three levels including, for example:

High (H): Load Large (ML=2)
Medium (M): Load Proper (ML=1)
Low (L): Load Small (ML=0).

Figure 10:
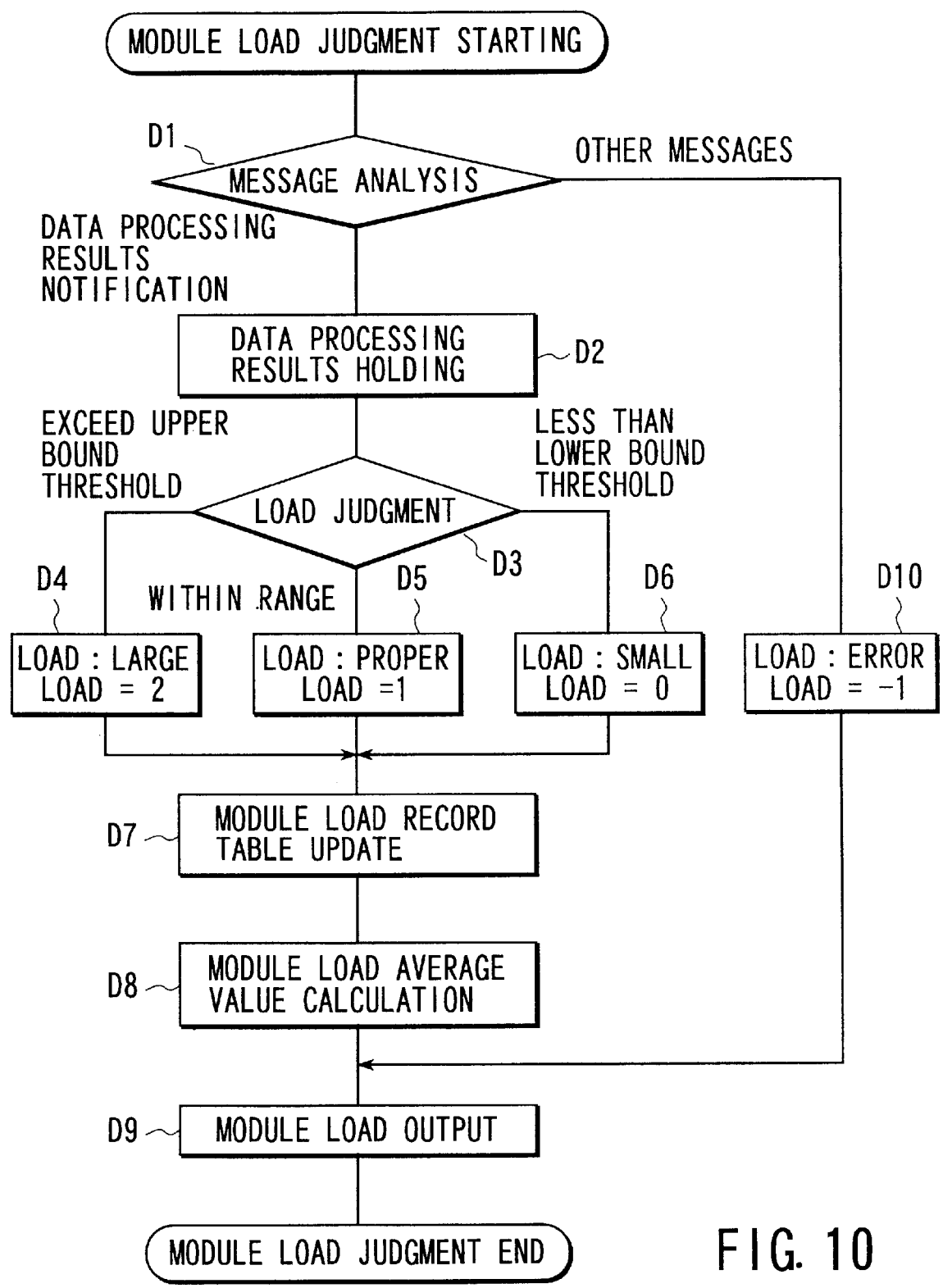
FIG. 10 is a flow chart for illustration of module load judgment processing by the module load judgment section 252b.

Then, there will be described module load judgment processing of the step A15 by the module load judgment section 252b in reference to a flow chart of FIG. 10.

When a message given from the message receiving and analyzing section 251 is a message to notify data processing results (step D1), the module load judgment section 252b stores the effective reception rate in the FIFO buffer 31 (step D2). At this time, when n data processing results are already stored in the FIFO buffer 31, the oldest data processing result is annulled. In the embodiment, time intervals of data processing results is not constant and each time when a message is notified, load judgment described below is performed. In data processing results, when there is taken up as an example the case where a monitoring target module of a module load (data processing results) is the stream decoding and reproducing device 132, if the monitoring target module is constructed. with an MPEG decoder realized by a hardware, there is adopted a normalized value of a data accumulation volume (for example, numeral values of 0 to 255 expressed in eight bits) in a buffer of a module. If a monitoring target module is constructed with an MPEG decoder realized by a software, there is adopted a value which is obtained by normalization of a ratio of the number of frames which have been skipped with neither decoding nor display to the number of reception frames per unit time. In the latter case, higher precision for data processing results is attained. In this case, it is defined that as a value of a normalized data processing result is increased, a load assumes a higher state (a low throughput state).

Now, if it is assumed that (normalized values of) latest n data processing results P1 to Pn are stored in the FIFO buffer 31, a value which is obtained by dividing a sum of a1·P1+. . . + an·Pn which are modified by weights al to an by a sum of the weights, that is an average data processing results, is input to the comparison operation circuit 34 in the module load judgment section 252b.

The comparison operation circuit 34 compares the average data processing result with the upper bound and lower bound thresholds of a permissible data processing result (step D3). When a data processing result exceeds the upper bound threshold, the comparison operation circuit 34 sets a judgment result as [H: Load Large (ML=2)] (step D4). When a data processing result is within the threshold range (equal to or larger than the lower bound threshold and equal to or smaller than upper bound threshold), a judgment result is set as [H: Load Proper (ML=1)](step D5) and when a data processing result is smaller than the lower bound threshold, a judgment result is set as [L: Load Small (ML=0)](step D6).

Figures 11, 12:
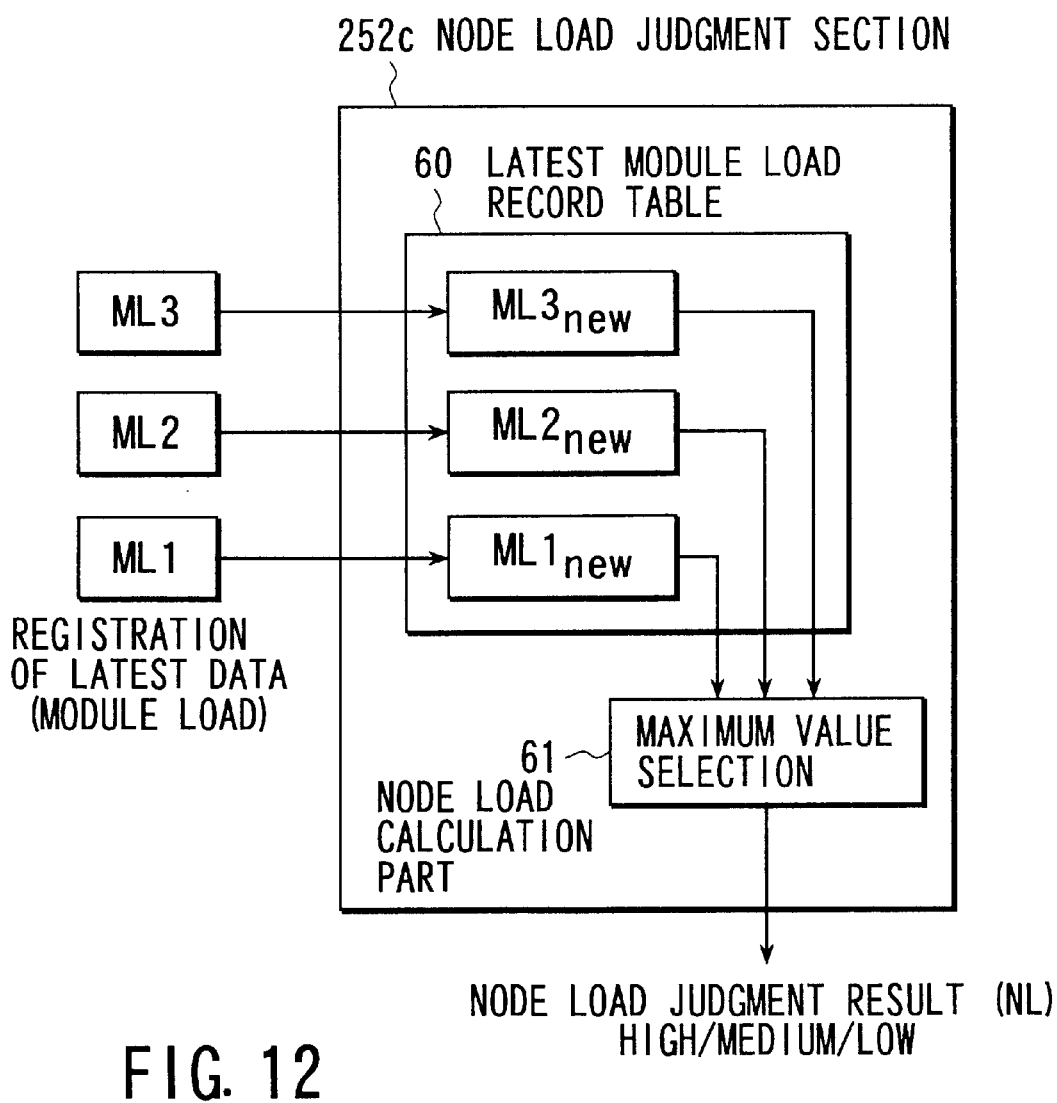
FIG. 11 is a representation showing an example of structure of a module load record table 50 provided in the module load judgment section 252b.
FIG. 12 is a block diagram showing a structure of a node load judgment section 252c.

In the embodiment, a change of a module load over time is considered for QoS judgment and therefore, there is ready in stock FIFO type module load record table 50, for example shown in FIG. 11, in order to store the maximum N (herein N=10) latest judgment results of a module load output from the comparison operation circuit 34. Judgment results in the comparison operation circuit 34 are stored in the module load record table 50 of FIG. 11 (step D7). After the N judgment results are stored in the table 50, each time when one new judgment result gets stored, the oldest judgment result at the point in time is annulled.

The module load judgment section 252b calculates an average value (a number is round off to an integer) of latest N1 judgment results (N1≦N, wherein N1=5 and corresponds to hatched portions of FIG. 11) in the link load record table 50 (step D8). The module load judgment section 252b outputs a calculated average as a final module load judgment result (module load) ML to the node load judgment section 252c in combination with a module identifier of a monitoring target module (step D9). The final judgment result LL, however, is not handled as a registration target to the table.

When a reception message is not correct, it is judged as an error and a load judgment result ML is set to −1 (step D10).

There will be taken up the case of the node load judgment section 252c where the number of modules which is a target for an over-all judgment assumes the maximum of 3. The node load judgment section 252c, as shown in FIG. 12, comprises: a latest module load record table 60 for storing module load judgment results (module load) ML1 to ML3 output, at the most latest chances, from the maximum number 3 of module load judgment sections 252b, as latest module load judgment results ML1new to ML3new; and a node load calculation section 61 for calculating a node load based on the latest module load judgment results ML1new to ML3new.

Figures 13, 14:
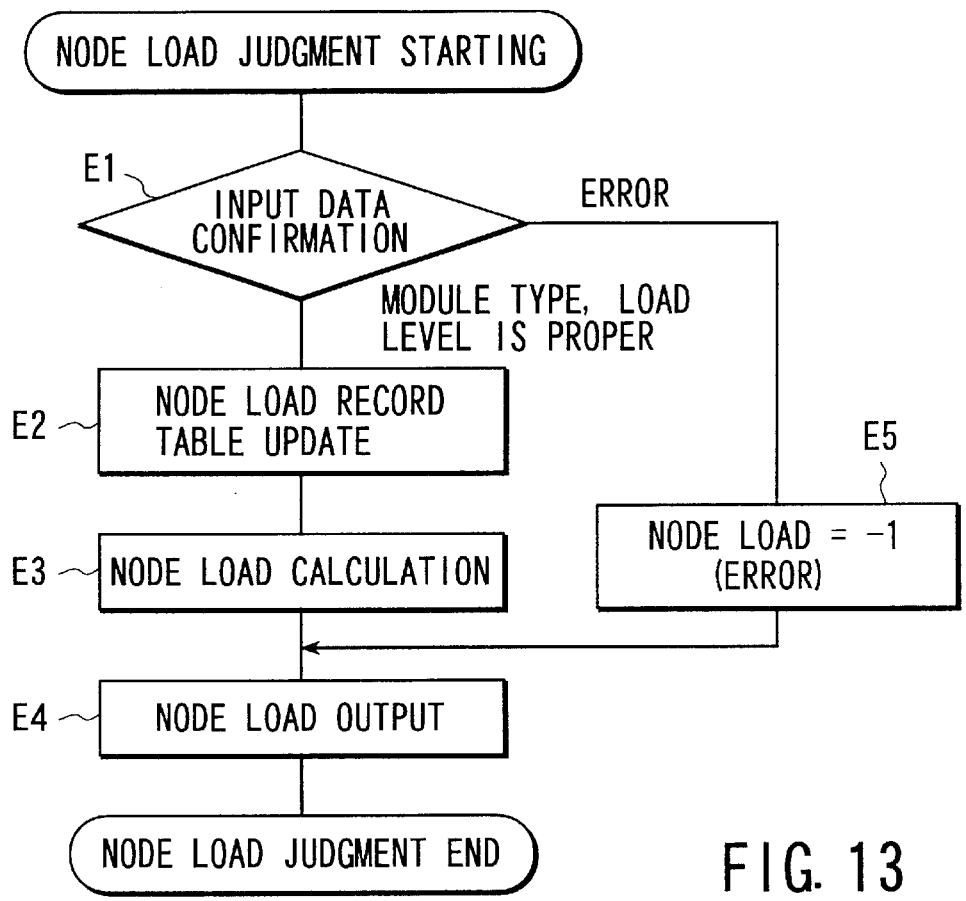
FIG. 13 is a flow chart for illustration of node load judgment processing by the node load judgment section 252c.
FIG. 14 is a representation showing an example of structure of a module load record table 600 which can substitute for a latest module load record table 60 in FIG. 12.

Then there will be described node load judgment processing of the step A16 by the node load judgment section 252c in reference to a flow chart of FIG. 13.

The node load judgment section 252c checks a module load judgment result (module load) MLi (i=1 to 3) attached with a module identifier sent from the module load judgment section 252b which judges a load of a monitoring target module belonging to a corresponding monitoring target node (step E1). If (a module type indicated by) the module identifier and a value of MLi (load level) are proper, the node load judgment section 252c updates a latest module load judgment result MLinew regarding a corresponding module in the latest module load record table 60 with a module load judgment result MLi sent, this time, from the module load judgment section 252b (step E2).

Then, the node load judgment section 252c calculates a node load by the node load calculation section 61 based on the module load judgment results ML1new to ML3new of respective monitoring target modules stored in the latest module load record table 60 (step E3). Here, the maximum value of the ML1new to ML3new is selected and it is determined as a node load judgment result (node load) NL. In other words, the node load calculation section 61 in the embodiment is constructed with maximum value selection means. A value of the node load NL is one of 2 (Load Large, that is H), 1 (Load Proper, that is M) and 0 (Load Small, that is L).

An average (a number is round off to an integer) of the ML1new to ML3new is obtained and it may be used as a node load NL. A change of a module load over time is considered and, as shown in FIG. 14, it is possible to use a module load record table 600 which is constructed with a FIFO buffer having a size of M (the number of monitoring target modules in the same monitoring target node)×N (the number of held module load judgment results regarding the same module) instead of the latest module load record table 60 (M=3, N=8 in the figure). In this case, an average (a number is round off to an integer) of the latest N1 judgment results (N1≦N, wherein N1=3 and hatched portions in FIG. 14) of the module load record table 600 is calculated in the node load calculation section 61 and the result may be used as a node load NL.

The node load judgment section 252c outputs to the QoS Judgement section 253 a node load NL calculated (selected) in the node load calculation section 61 in combination with a node identifier of a monitoring target node which is specific to itself (step E4).

When a module load MLi (i=1 to 3) attached with a module identifier sent from the module load judgment section 252b is not proper, the module load is judged as an error and a node load NL is set to −1 (step E5).

In the above description of the node load judgment section 252c, the number M of monitoring target modules which belong to a corresponding monitoring target node is assumed for convenience and a node load is to be determined (by selecting the maximum module load) from three module load judgment results. In the embodiment, M=1 as in the example of FIG. 4. In this case, only one module load is the maximum module load as it is, whereby the module load may be set to a node load.

The QoS judgment section 253 comprises: a latest load judgment result record table 70 for storage of a link load LL output at a the latest chance from the link load judgment section 252a and a node load NL output at a the latest chance from the node load judgment section 252c as a latest link load LLnew and a latest node load NLnew; and a matrix judgment section 71 performing QoS judgment using the QoS judgment matrix table 710 from a combination of a latest link load LLnew and a latest node load NLnew stored in the latest load judgment result record table 70.

The QoS judgment matrix table 710 is used for determination of one QoS judgment result from a combination of a link load LL and a node load NN in three levels of UP (=2)/KEEP (=1)/DOWN (=0). The matrix table 710 consists of 9 matrix elements by which QoS judgment results corresponding to combinations of the link loads LL (three levels of H, M, L) and node loads NL (three levels of H, M, L) are in advance set.

The QoS judgment section 253 further comprises: a FIFO buffer with n stages having a table structure of a size 1×n for storage of the maximum of n QoS judgment results by the matrix judgment section 71 in the order of a time series; a window setting section 73; and a QoS judgment result correction section 74.

The window setting section 73 sets a range (a widow size) W of a history of QoS judgment results, in the past, in the FIFO buffer 72 which are referred to in the QoS judgment result correction section 74 according to a latest judgment result Q by the matrix judgment section 71.

The QoS judgment result correction section 74 refers to QoS judgment results in the past in the FIFO buffer 72 which fall in a range of a window size which is set by the window setting section 73 and corrects the judgment result Q based on the reference result and a latest judgment result Q and outputs the corrected result as a final QoS judgment result to the QoS parameter calculation section.

Figure 15:
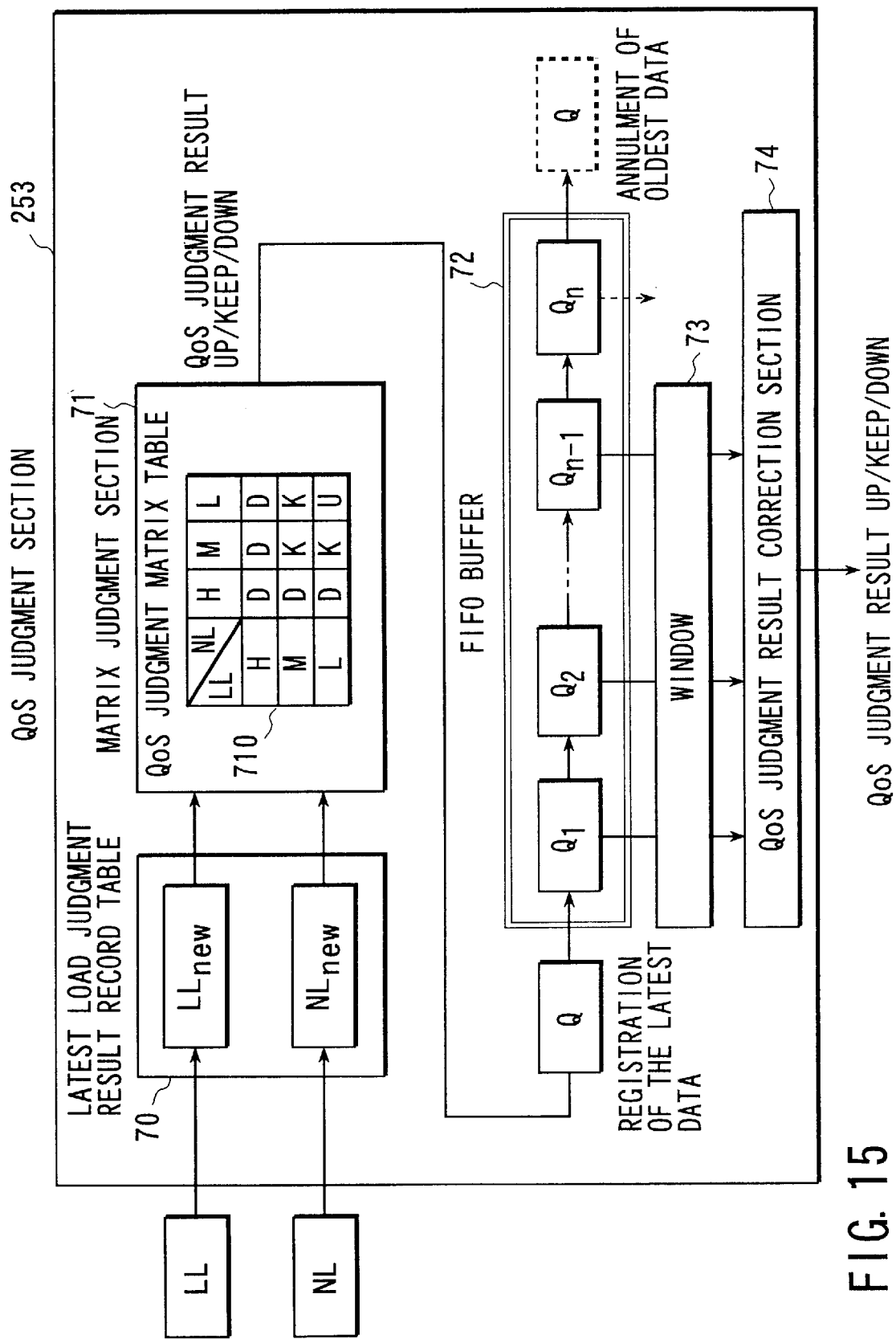
FIG. 15 is a block diagram showing a structure of a QoS judgment section 253.
Figure 17:
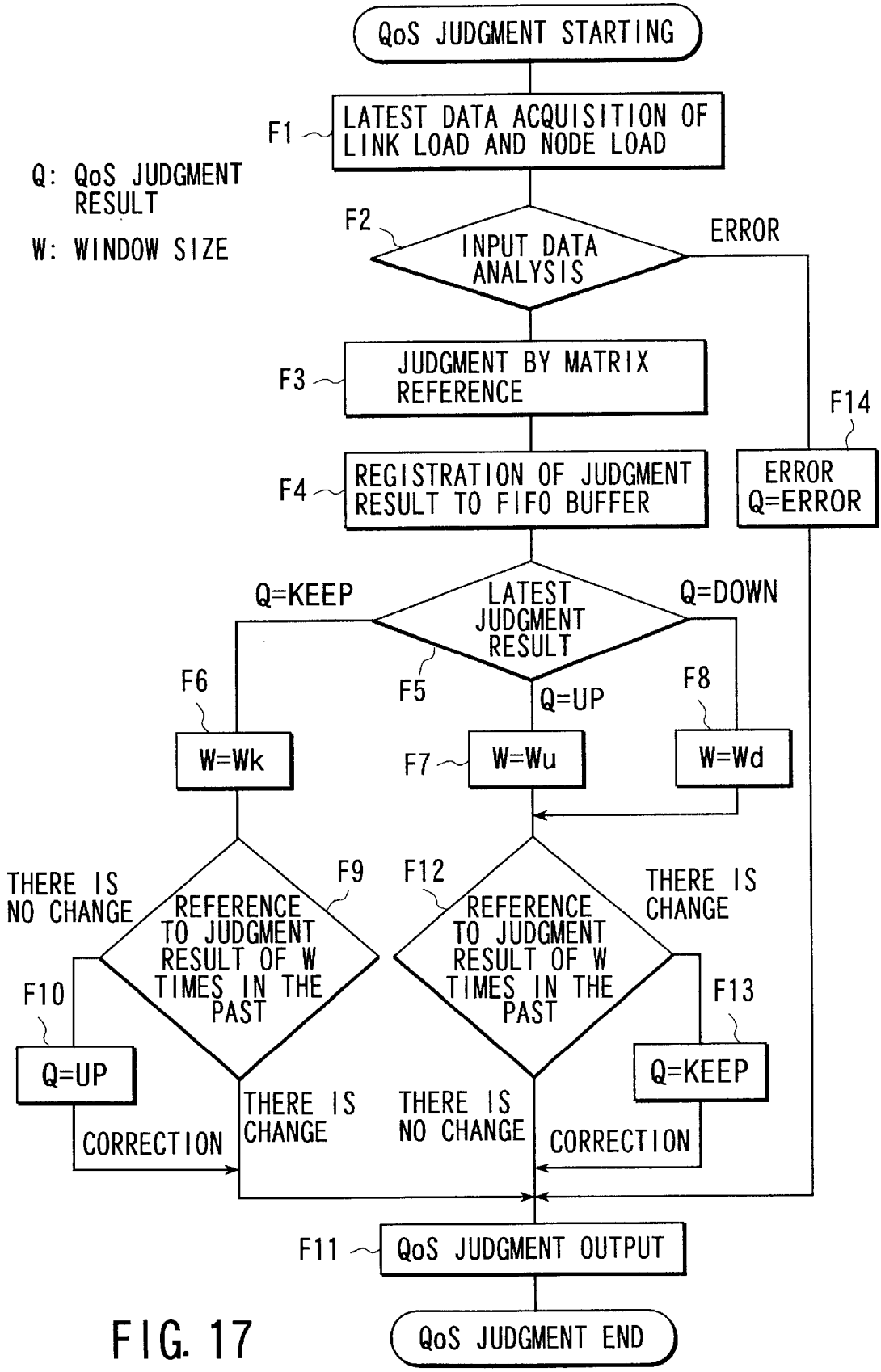
FIG. 17 is a flow chart for illustration of QoS judgment processing by a QoS judgment section 253.

Then, there will be described QoS judgment processing of the step A18 by the QoS judgment section 253 having a structure of FIG. 15 in reference to a flow chart of FIG. 17.

The QoS judgment section 253 receives a latest link load LL attached with a module identifier output from the link load judgment section 252a and a latest node load NL attached with a node identifier output from the node load judgment section 252c (step F1). Then, each time when the QoS judgment section 253 receives a latest link load LL and a latest node load NL, the QoS judgment section 253 checks correctness of the link load LL and the node load NL (step F2).

If the module identifier and the LL value (load level) and the node identifier and NL value (load level) are correct, the QoS judgment section 253 stores the LL and NL as latest LLnew and latest NLnew in the latest load judgment result record table 70 and activates the matrix judgment section 71 in the QoS judgment section 253.

Thereby, the matrix judgment section 71 refers to the QoS judge matrix table 710 from a combination of a latest link load LLnew and a latest node load NLnew and acquires a QoS judgment result (one of UP (=2)/KEEP (=1)/DOWN (=0)) specific to the combination of LLnew and NLnew (STEO F3). The QoS judgment result Q is stored in the FIFO buffer 72 as a latest judgment result Q1 (step F4). At this time, when n QoS judgment results Q1 to Qn are already stored in the FIFO buffer 72, the oldest QoS judgment result is annulled and the residual Q1 to Qn-i assume Q2 to Qn.

The window setting section 73 in the QoS judgment section 253 sets a window size W based on a latest QoS judgment result Q (Q1) (step F5 to F8). That is, when Q (Q1) is one of KEEP (=1)/UP (=2)/DOWN (=0)r the window setting section 73 sets window sizes W to one of respective Wk/Wu/Wd. The window size W shows the number of QoS judgment results in the past.

When a latest QoS judgment result Q (Q1) is KEEP (=1), the QoS judgment result correction section 74 in the QoS judgment section 253 refers to W (=Wk) QoS judge results Q1 to Qw in the past stored in the FIFO buffer 72 and checks whether or not KEEP is continued in W times in the past (step F9).

If KEEP is continued in W times, the QoS judgment result correction section 74 judges data reception and data processing are both in the stable state. The QoS judgment result correction section 74 changes a QoS judgment result from KEEP to UP (step F10) and processing is advanced to step F11. This is a measure to cope with a situation where there is a small chance that a judgment result is UP in the QoS judgment by the QoS judge matrix table 710 of FIG. 16A. That is, in order that a QoS judgment result assumes UP in the example of FIG. 16A, it is required that both of a link load LL and a node load NL assume L (Low). It is when an effective reception rate exceeds a set transmission rate that a link load LL assumes L (Low). Since this situation, however, seldom occurs, it is rare, as described above, that a QoS judgment result Q assumes UP.

Therefore, a QoS judgment matrix table 710' shown in FIG. 16B may be used, instead of the above described measure, wherein the QoS judgment matrix table 710 shown FIG. 16A is not used. When the matrix table 710' is used, a QoS judgment result assumes UP even in a combination of a link load LL of M (Medium) and a node load NL of L (Low).

On the other hand, if KEEP is not continued in W times, that is if there are a jitter, a QoS judgment result correction section 74 does not correct (change) a QoS judgment result Q and processing goes to step F11 with nothing done.

When a latest QoS judgment result Q (Q1) is UP (=2) or DOWN (=0), the QoS judgment result correction section 74 in the QoS judgment section 253 refers to W (=Wu or Wd) QoS judgment results Q1 to Qw in the past stored in the FIFO buffer 72 and checks whether or not UP or DOWN is continued in W times (step F12).

If UP or DOWN is not continued as the same judgments in W times (Wu times or Wd times) in the past, that is there are jitters, the QoS judgment result correction section 74 changes a QoS judgment result from UP or DOWN to KEEP (step F13) and processing is advanced to step F11. This processing is a measure to suppress an excessive reaction (control) to pulse-like load variations.

On the other hand, if UP or DOWN is continued as the same judgments in W times (Wu or Wd times) in the past, the QoS judgment result correction section 74 does not correct a QoS judgment result Q and processing is advanced to step F11 with nothing done.

At step F11, when a QoS judgment result Q is corrected by the QoS judgment result correction section 74, the corrected QoS judgment result Q is output to the QoS parameter calculation section 254, and when a QoS judgment result Q is not corrected, a latest QoS judgment result Q judged by the matrix judgment section 71 is output to the QoS parameter calculation section 254.

When an input data (a link load LL or a node load NL) is not proper, the data is judged as an error and a QoS judgment result Q is set to ERROR (=−1) (step F14).

Figure 18:
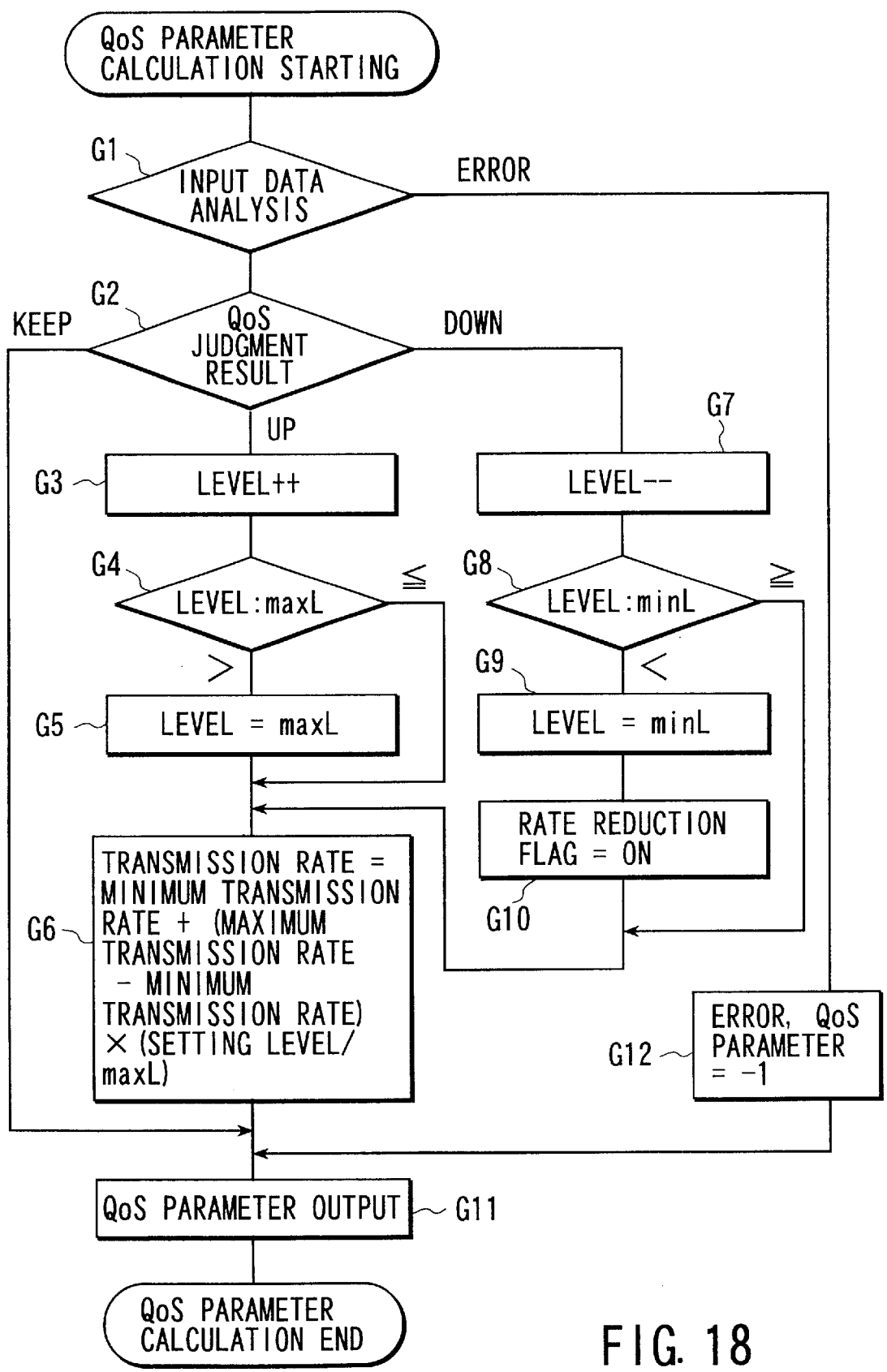
FIG. 18 is a flow chart for illustration of Qos parameter calculation processing by a QoS parameter calculation section 254.

Then, there will be described QoS parameter calculation processing of the step A19 by the QoS parameter calculation section 254 in reference to a flow chart of FIG. 18. A QoS parameter (transmission rate) is changed in a control range of a maximum transmission rate/a maximum transmission rate set by a user specification or the like prior to stream transfer starting. In this case, the set control range is divided into N (for example N=10) levels (0 to N−1) and a level is controlled according to a QoS judgment result. Level 0 is a level (minL) which corresponds to a minimum transmission rate (a lower bound limit of a transmission rate control range) and Level N−1 is a level (maxL) which corresponds to a maximum transmission rate (an upper bound limit of a transmission control range). The maximum transmission rate is set a value equal to or lower than a content rate.

Each time when the QoS parameter calculation section 254 receives a QoS judgment result Q output from the QoS judgment section 253, the QoS parameter calculation section 254 checks correctness of the QoS judgment result (step GI). If the QoS judgment result is correct (Q is not −1 which indicates ERROR), the QoS parameter calculation section 254 checks whether or not the QoS judgment result Q is one of KEEP (=1)/UP (=2)/DOWN (=0) (step G2).

When a QoS judgment result is UP (=2), the QoS parameter calculation section 254 shifts up a current set level by one level (step G3). Then, the QoS parameter calculation section 254 fixes the set level to the maximum level maxL when the set level after the shift-up by one level exceeds the maximum level maxL (=N−1) (step G4, step G5). If the set level does not exceed, processing goes to step G6 with nothing done.

On the other hand, a QoS judgment result is DOWN (=0), a current setting level is shifted down by one level (step G7). If a set level after the shift-down by one level is smaller than the minimum level minL (=0), the QoS parameter calculation section 254 not only fixes the set level to the minimum level minL but sets a rate deduction flag to the ON state (step G8 to step G10). If a set level after the shift-down is not smaller, processing goes to the step G6 with nothing done.

The QoS parameter calculation section 254 calculates a transmission rate, that is a QoS parameter at step G6 according the following equation:

Transmission rate=minimum transmission rate+(maximum transmission rate −minimum transmission rate)×(setting level/maxL).

As is apparent form the equation, a quality is improved, though a cost is increased, as a maximum transmission rate is increased.

After the QoS parameter calculation section 254 calculates a QoS parameter at step G6, processing goes to step G11. On the other hand, when a QoS judgment result Q assumes KEEP (=1), a current setting level is maintained with no change, no calculation of a transmission rate (QoS parameter) is performed and processing goes to step G11.

When step G6 is executed and program goes to step G11 because of a QoS judgment result of UP or DOWN, the QOS parameter calculation section 254 outputs a QoS parameter (transmission rate) calculated at the step G6 to the message transmission section 255 together with a corresponding QoS judgment result and a node identifier of a QoS control target node. When a step G6 is not executed and processing goes to step G11 because of a QoS judgment result of KEEP (=1), the QoS parameter calculation section 254 transmits a Qos parameter same as a previous time to the message transmission section 255 together with the QoS judgment result and a node identifier of a QoS control target node.

When an input data (QoS judgment result Q) is not proper, the data is judged as an error and a QoS parameter is set to ERROR (=−1) (step G12).

When a rate deduction flag is made to assume ON, if an interruption mode is set, the manager and controller 256 sends interruption notification requesting to transmit a stream transfer interruption message instead of a QoS setting message (based on a QoS parameter from the QOS parameter calculation section 254) to the message transmission section 255.

Figure 19:
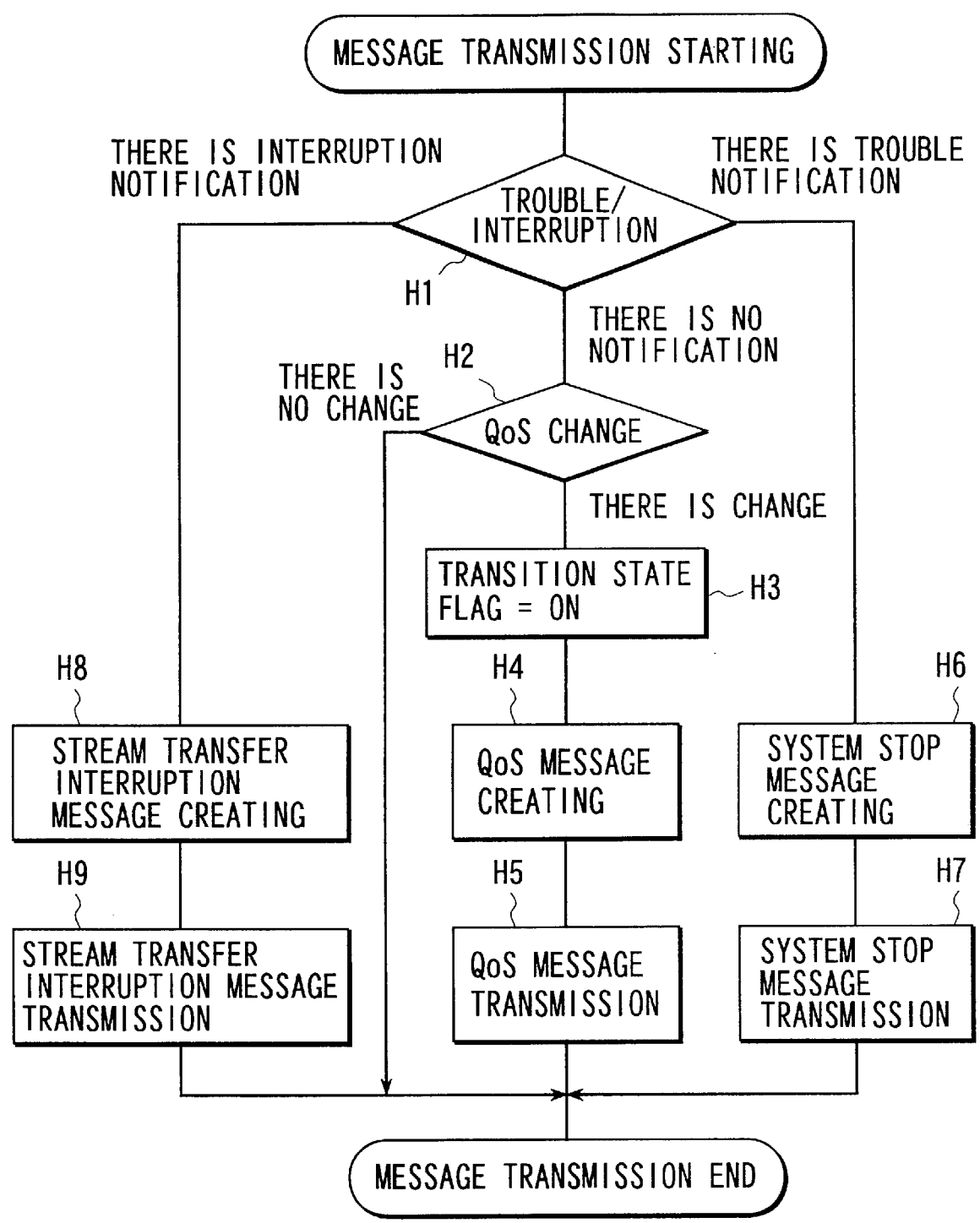
FIG. 19 is a flow chart for illustration of massage transmission processing by a message transmission section 255.

Then, there will be described message transmission processing of the step A20 by the message transmission section 255 in reference to a flow chart of FIG. 19.

When the message transmission section 255 receives a combination of a QoS judgment result output from the QoS parameter calculation section 254, a QoS parameter and a node identifier of a control target node, the message transmission section 255 checks whether or not there is trouble notification or interruption notification from the manager and controller 256 (step H1).

When the message transmission section 255 receives neither trouble notification nor interruption notification, the message transmission section 255 checks whether or not there is a change in a Qos parameter (step H2).

If a QoS judgment result is UP or DOWN and a QoS parameter receives a change, the message transmission section 255 makes a transition flag managed by the manager and controller 256 to assume ON (step H3). Thereafter, the message transmission section 255 creates a QoS setting message to request a change (setting) of the QoS parameter (step H4). The message transmission section 255 transmits (feeds back) the message to the QoS control target node (here the transmission node 11 or the relay node 12) through the communication controller 24 (step H5).

On the other hand, when a QoS judgment result is KEEP or when a QoS judgment result is UP or DOWN but a QoS parameter is not changed, the message transmission section 255 does not execute any of steps H3 to H5, that is does not perform transmission of a QoS setting message and the like and the message transmission is terminated with nothing done. When a QoS parameter is not changed, too, a message to request setting of the QoS parameter may be transmitted.

When the message transmission section 255 receives trouble notification from the manager and controller 256 according to a trouble informative message transferred from the message receiving and analyzing section 251 (step H1), the message transmission section 255 creates a system stop message and transmits the message to nodes (here the transmission node 11 and the relay node 12) (steps H6, H7).

When the message transmission section 255 receives interruption notification from the manager and controller 256 (step H1), the message transmission section 255 creates a stream transfer interruption message and transmits the message to nodes (here the transmission node 11 and the relay node. 12) (steps H8, H9). Thereby, when a QoS parameter showing a transmission rate lower than a minimum transmission rate is output from the QoS parameter calculation section 254 in a state where interruption mode is set, stream transfer is interrupted. On the other hand, when a QoS parameter showing a transmission rate lower than the minimum transmission rate is transmitted from the QoS parameter calculation section 254 in a state where an interruption mode is not set, that is a continuation mode is set, stream transfer is continued at the minimum transmission rate.

As described above, when a QoS setting message is transmitted from the message transmission section 255 (which the QoS controller 25 of the reception node 13 as a management node has), the stream conversion section 23 which the stream transfer device 20 of the transmission node 11 or the relay node 12 (QoS control target nodes) has performs conversion setting (update) processing of a QoS parameter (transmission rate) which the message requests.

Figure 20:
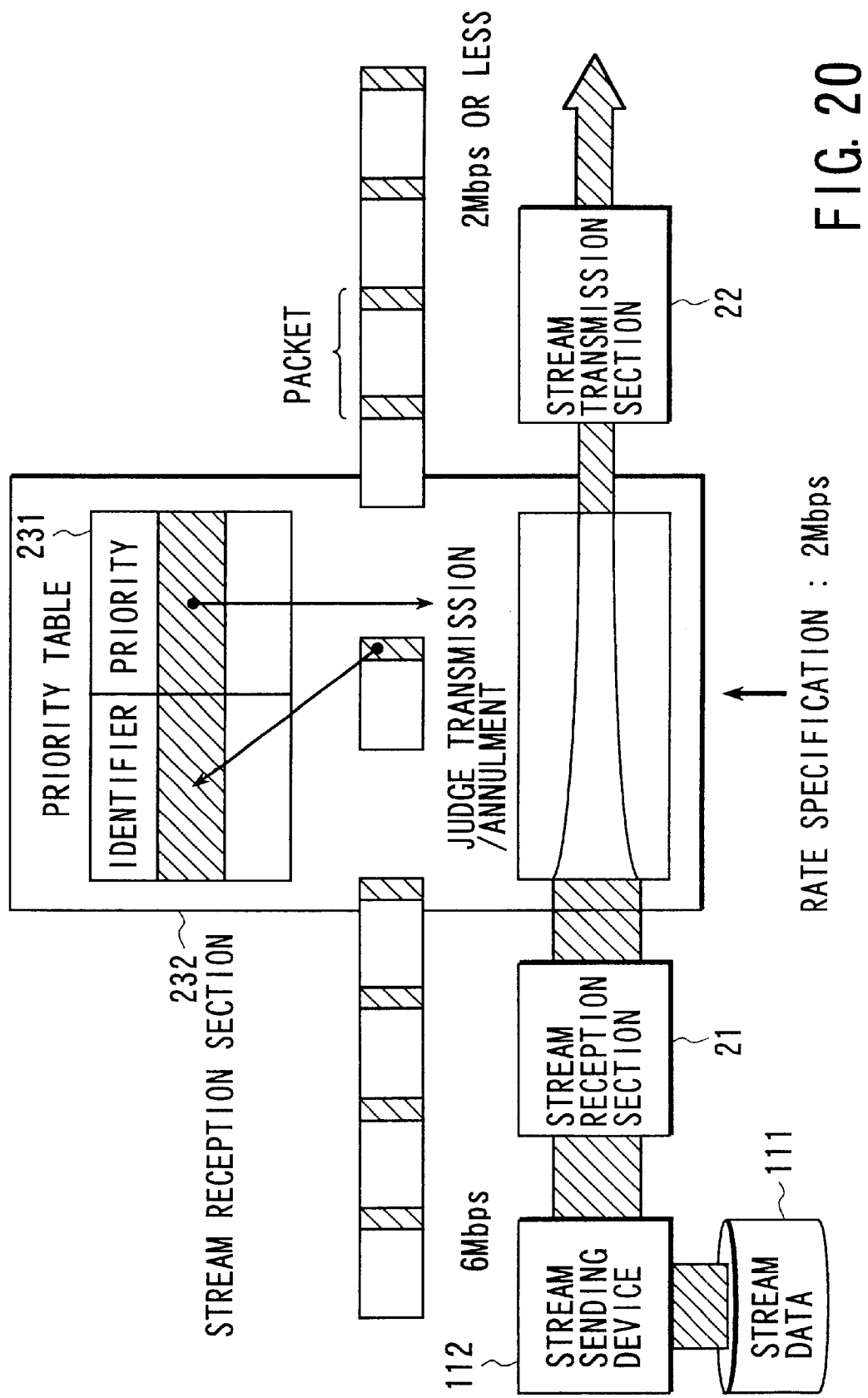
FIG. 20 is a conceptual representation for illustration of a stream shaping function of a stream conversion section 23.

FIG. 20 is a conceptual representation for illustration of a stream shaping function of a stream conversion section 23. The conceptual representation of FIG. 20 is prepared conceiving a stream conversion section 23 which the steam transfer device 20 of the transmission node 11 has.

The term "stream shaping" is a scheme that when a packetized stream attached with priority information on the transmission side is transferred, a packet with low priority in the stream is positively annulled based on a priority whereby quality adjustment and transfer rate adjustment are performed, and further stream transfer maintaining real time mode of operation is realized.

Features of the stream adopted here: (1) the stream is divided into data blocks in terms of data hierarchy and data kinds, in other words, data attributes and has a packetized stream structure in which each data block is attached with a header, (2) the header of each packet is attached with a packet identifier which makes data hierarchy and a data kind to be distinguishable from one another with no complex stream analysis; in other words, data attribute information indicating a data attribute is attached to each data block, (3) a data structure of a stream has a periodicity and a data volume for one cycle is almost constant and (4) a control packet (cycle notification packet) indicating an encoding cycle is inserted in the stream, as shown in FIG. 21, so that a periodicity of a data structure of a stream is detectable with no complex stream analysis; transfer control standard information is cyclically inserted.

A header portion of a packet is constructed with fields of a synchronous bit, a packet identifier, a link, and a packet length, as shown in FIGS. 22A to 22D.

The synchronous bit is used for detection of (the header portion of) a packet in a stream.

The packet identifier indicates a kind of data (attribute of data) included in a payload of a packet. The packet identifier has a hierarchical structure such that not only a stream type (data type) such as video or audio, but even a picture type of MPEG video can be distinguishable from one another. In FIG. 23, there is shown an example of a hierarchical structure of a packet identifier in the case where a broadcast program in which video, audio and other additional data are integrated as one set is applied to an MPEG stream in a double multiplexed manner. In this case, a packet identifier has three hierarchy structure consisting of a program, a data type and a picture type.

The MPEG video stream adopts an inter-frame predictive encoding scheme and further three kinds of picture type including I, P, B. Decoding data of I, P pictures is required for decoding of P, B pictures. In other words, in the MPEG video stream, there is an absolute priority in the written order of I picture, P picture and B picture. In the stream shaping processing, a quality of a decoding image is greatly deteriorated if this priority is not observed. Therefore, a flag indicating an absolute priority (absolute priority flag) is provided, for example, at the lowest order bit of a field in which a picture type (identifier sub-field) is set. Accordingly, a packet identifier plays a double role functioning as an indicator of a priority in the stream shaping processing (data priority). However, a priority of data type or the like (for example, a priority between video and audio) can be changed by a user.

A control flag to identify whether a corresponding packet is data packet or a control packet is assigned to a part (for example the highest order bit) of the packet identifier.

The link field shows that when encoding data for one video frame is divided to a plurality of packets (data packets) as shown in FIG. 24A to FIG. 24C, a packet has a dependency relation (link relation) with a front packet and/or a back packet, that is: a dependency relation only with a back packet which has the same identifier (the leading packet of a frame); a packet has a dependency relation with a front and back packet which have the same identifier; a packet has a dependency relation only with a front package (the end packet of a frame); or a packet is an independent packet. The link field plays a role as a demarcation between data of the same type (with the same identifier) which are continued.

The packet length field shows a size of payload. The packet length may show a size of a packet.

In the stream conversion section 23 of FIG. 20, setting (creation) of a correspondence table 231 between a packet identifier and a packet priority and specification of a transmission rate are performed prior to the stream shaping processing through the communication controller 24. The packet identifier is an identifier which is attached in encoding and serves as information on a packet priority. However, here, since a packet priority can be changed according to a user's specification, the correspondence table (hereinafter referred to as priority table) 231 between a packet identifier and a priority is set as described above. The packet priority having a smaller numeral value is higher in priority.

Input to the stream conversion section 23 is a packetized stream received by the stream reception section 21 while being retrieved from the data accumulation device 111 by the stream sending device 112. The stream conversion section 23 refers to the priority table 231 using a packet identifier, as a key, which is attached to the header of each packet in an input stream and thereby acquires a packet priority corresponding to the packet identifier. The stream conversion section 23 compares an acquired packet priority with a threshold, described later, which is update-set giving consideration to transmission results in a previous cycle and thereby judges whether the packet is transmitted or annulled and operates according to the judgment result.

Features of the stream shaping processing applied in the stream conversion section 23 are as follows: a first feature is that a transmission rate of the control target node is controlled so as to be a transmission rate determined dynamically by the QoS controller 25 (which the stream transfer device 20 in the reception node 13 has) based on a load of at least one node (monitoring target node) located in a position downstream from the control target node, a load of a link with a node at the front stage and a load of the monitoring target node in a rate control range of a user's specification and a second feature is that in a setting change to the dynamically determined transmission rate, transition state notification messages, which give information on control starting/end, are sent to the QoS controller 25 (which the stream transfer device 20 in the reception node 13 has) when control gets started so as to achieve the transmission rate being requested by a QoS setting message from (the message transmission section 255 in) the QoS controller 25, in other words at a time in point of update starting of a QoS parameter (transmission rate) and when the transmission rate gets achieved, that is at a time in point of update end of the QoS parameter (transmission rate).

Figure 25:
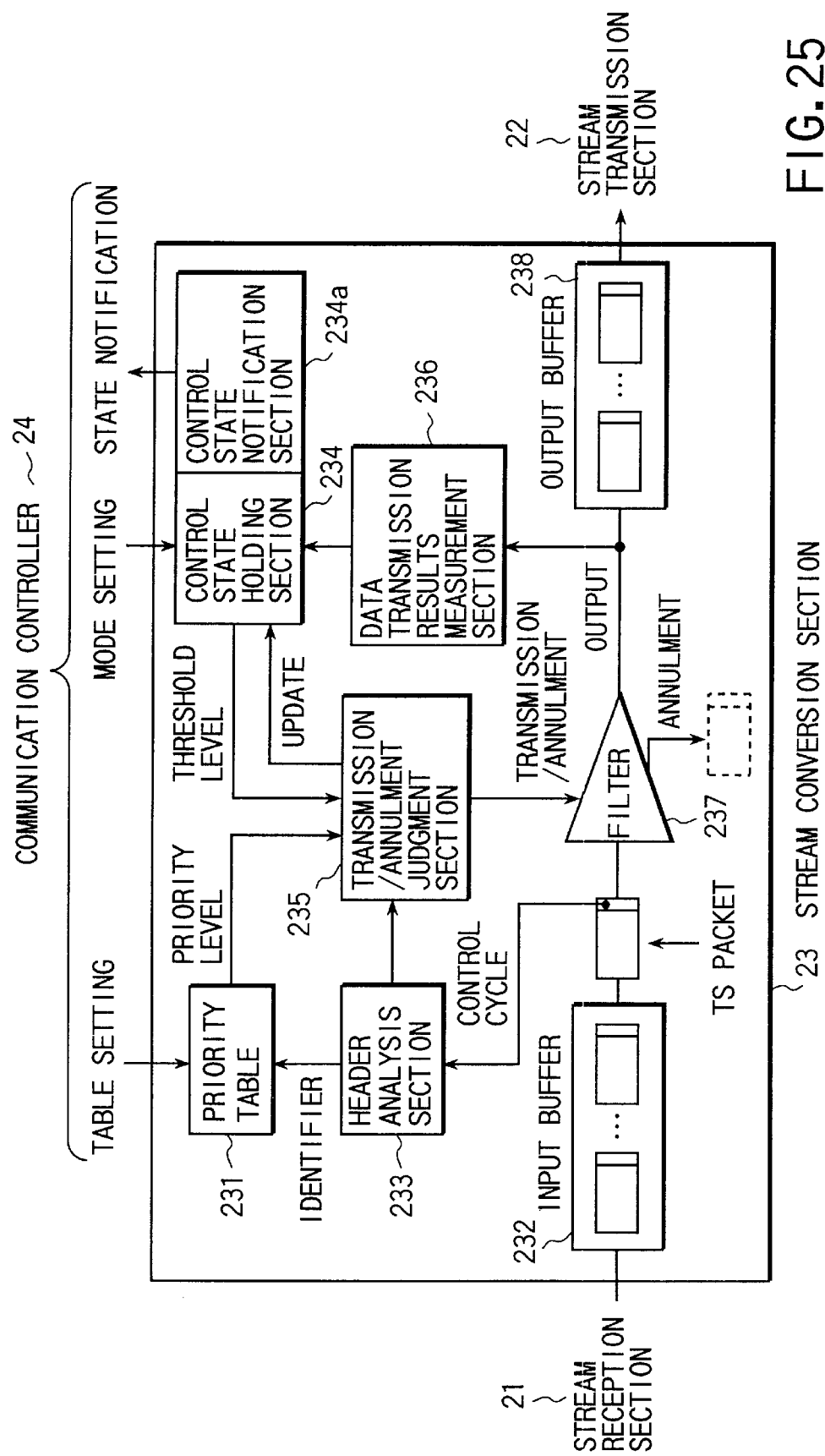
FIG. 25 is a block diagram showing a detailed structure of the stream conversion section 23 having a stream shaping function.

FIG. 25 is a block diagram showing a detailed structure of the stream conversion section 23:having a stream shaping function.

The stream conversion section 23, in addition to the priority table 231 shown in FIG. 20, comprises: an input buffer 232; a header analysis section 233; a control state holding section 234; a transmission/annulment judgment section 235; a data transmission results measurement section 236; a filter 237; and an output buffer 238.

The input buffer 232 is a FIFO buffer in which there is temporarily stored a packetized stream (input stream) which is input to the stream conversion section 23 while being received by the stream reception section 21.

The header analysis section 233 performs analysis of the header of each packet in an input stream held in the input buffer 232 and acquires information on a packet identifier and a cycle. The priority table 231 is referred to by the packet identifier to attain a packet priority.

The control state holding section 234 is used for holding a parameter set from outside and a parameter showing an internal control state. The internal control state parameters include: a first level variable threshold (hereinafter referred to as transmission permissible priority) which serves as a demarcation (judgment standard) for frame transmission/annulment; a second level variable threshold (hereinafter referred to as the number of transmission permissible frames) which shows the number of frames with the same priority as a transmission permissible priority which can be transmitted in one cycle; and the like. The transmission permissible priority and the number of transmission permissible frames (threshold) are updated by a transmission result in a previous cycle.

The control state holding section 234 is added with a control state notification section 234a which notifies an internal control state (a set transmission rate, an effective transmission rate and transition state starting/end) to the QoS controller 25 in a management node (the reception node 13) through the communication controller 24.

The transmission/annulment judgment section 235 compares a packet priority (priority level) obtained from the priority table 231 with a transmission permissible priority stored in the control state holding section 234 and judges transmission/annulment of a packet based on a comparison result. To be concrete, when the packet priority is lower than a first level variable threshold, the transmission/annulment judgment section 235 judges transmission and when the packet priority is equal to the first level variable threshold, the transmission/annulment judgment section 235 judges transmission/annulment in consideration of transmission results in a previous cycle. When the packet priority is higher than the first level variable threshold, the transmission/annulment judgment section 235 judges annulment.

The data transmission results measurement section 236 measures a transmission result per cycle (a transmission volume, a transmission rate and the like).

The filter 237 sends a packet which is judged as transmission by the transmission/annulment judgment section 253 after being retrieved from the input buffer 232 as an output packet from the input buffer 232 to the output buffer 238.

The output buffer 238 is a FIFO buffer to temporarily store an output stream composed of output packets.

Then, there is described operation centralized in stream shaping in the stream conversion section 23, wherein a MPEG video stream is taken up as a target of description and operation is not performed in packets but in frames each as a unit, in order to simplify the description.

The MPEG video has a structure of GOP (Group of Picture) and a stream is constructed with a continuation of GOPs. A data volume of each GOP is almost constant.

In the embodiment, a data priority (packet priority) which is necessary for stream shaping is graded into levels of I picture (picture is the same as frame in meaning), P picture and B picture of MEPG video stream in the order. A GOP of MPEG is adopted as a control standard (control cycle). In other words, a control packet is inserted at a demarcation between GOPs. A payload of the control packet includes information (GOP information) showing the number of frames per second, a size of a frame and the like.

A MPEG video stream as a target is assumed to be subjected to encoding with CBR (Constant Bit Rate). Besides, in description, it is assumed that a stream is of 30 fps (frame per second) and there is included image data for 0.5 second, that is of 15 frame in one GOP. In a concrete manner, it is assumed that there is included one I picture, four P pictures and ten B pictures in one GOP.

Other conditions adopted here as follows: Levels of the priority are defined being given numerals as: I picture: priority=1, P picture: priority=2 and B picture: priority=3. As a numeral value of a priority is decreased, a priority means to be higher. For example, data in a GOP layer (control packet) with a higher order than a picture layer is assigned with priority=0. Data with a priority=0 is transmitted without fail.

A major control parameter for steam shaping applied in the embodiment is a bit rate (transmission rate). A bit rate shows a transfer data volume per second and a unit therefor is bps (bits per second).

In the embodiment, similar stream shaping processing is performed in the stream conversion sections 23 of the transmission node 11 and the relay node 12. Therefore, stream shaping processing in the transmission node 11 is described as the center of description.

First of all, in the first one cycle (one GOP) in stream transfer, the stream conversion section 23 in the transmission node 11 transfers all frames (all packets) while no frame (packet) annulment is performed. There is performed a similar stream transfer (relay) in the relay node 12 to the reception node 13 downstream therefrom and reception and decoding processing of the stream are performed in the reception node 13.

At this point, measurements, as described above, are performed on data reception results and data processing results, that is a link load and a module load relating to stream transfer in monitoring target modules (the stream reception section 21 and the stream conversion section 23) in the relay node 12 and in monitoring target modules (the stream reception section 21 and the stream decoding and reproducing device 132). The measurement results are notified to the QoS controller 25 of the reception node 13 (as a centralized QoS management node) using a QoS state message.

The QoS controller 25 of the reception node 13 performs QoS judgment based on a notified load measurement value and determines a QoS parameter used for QoS control at the reception node 11 and the relay node 12 as control target nodes. In this case, the QoS parameters are determined with current transmissions at the monitoring target nodes as the maximum transmission rate. The QoS controller 25 requests the transmission node 11 and the relay node 12 for setting change of a QoS parameter (=transmission rate) by QoS setting messages after the QoS controller 25 determines the QoS parameters. That is, the QoS controller 25 feeds back the QoS parameter to the control target nodes based on a link load and a module load (node loads) relating to stream transfer. Thereby, the stream conversion sections 23 of the transmission node 11 and relay node 12 performs stream shaping processing so that stream transfer may be performed at a requested transmission rate which the QoS parameter shows.

Figure 26:
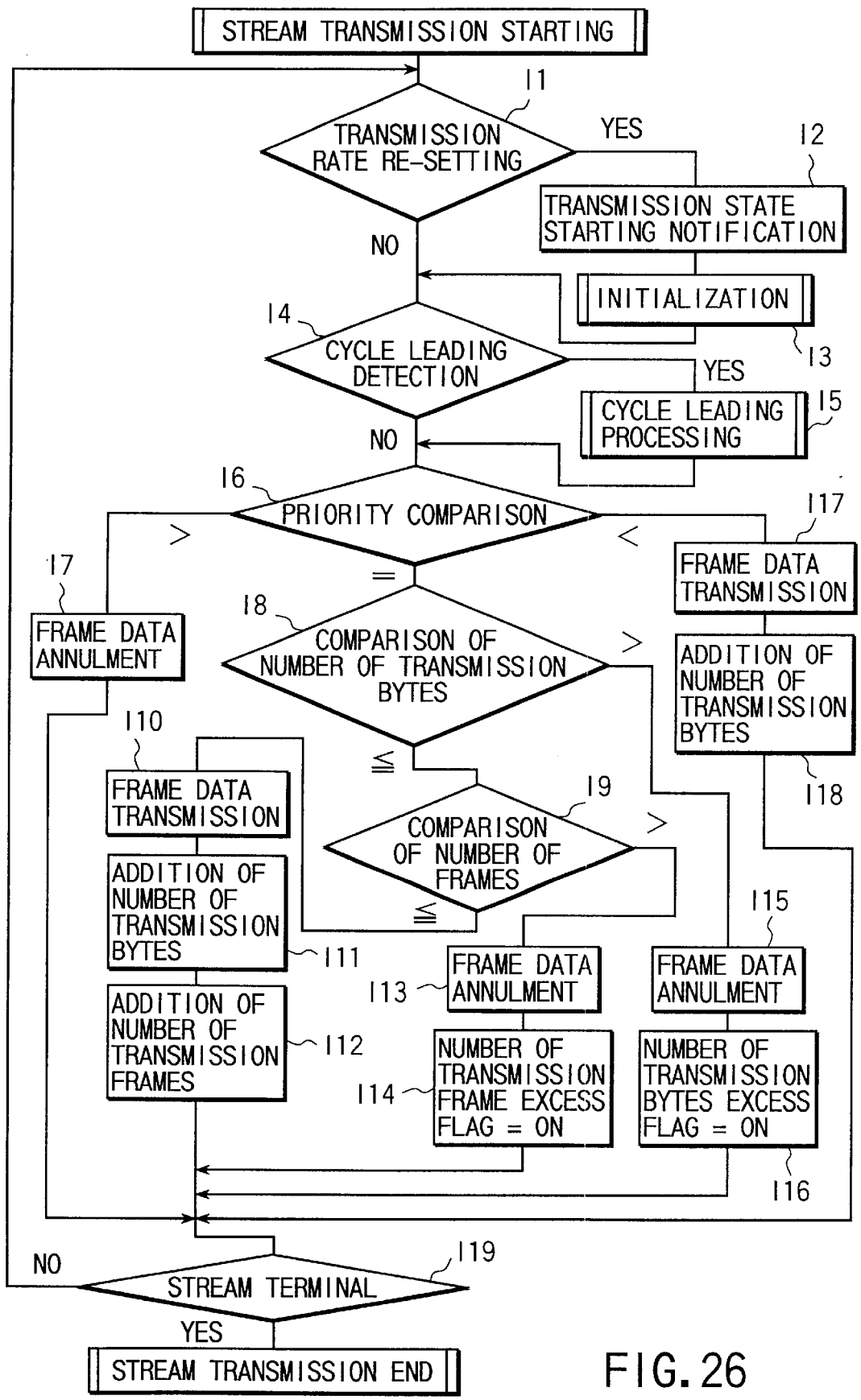
FIG. 26 is a flow chart for illustration of stream transmission processing accompanied with stream shaping by the stream conversion section 23.
Figure 27:
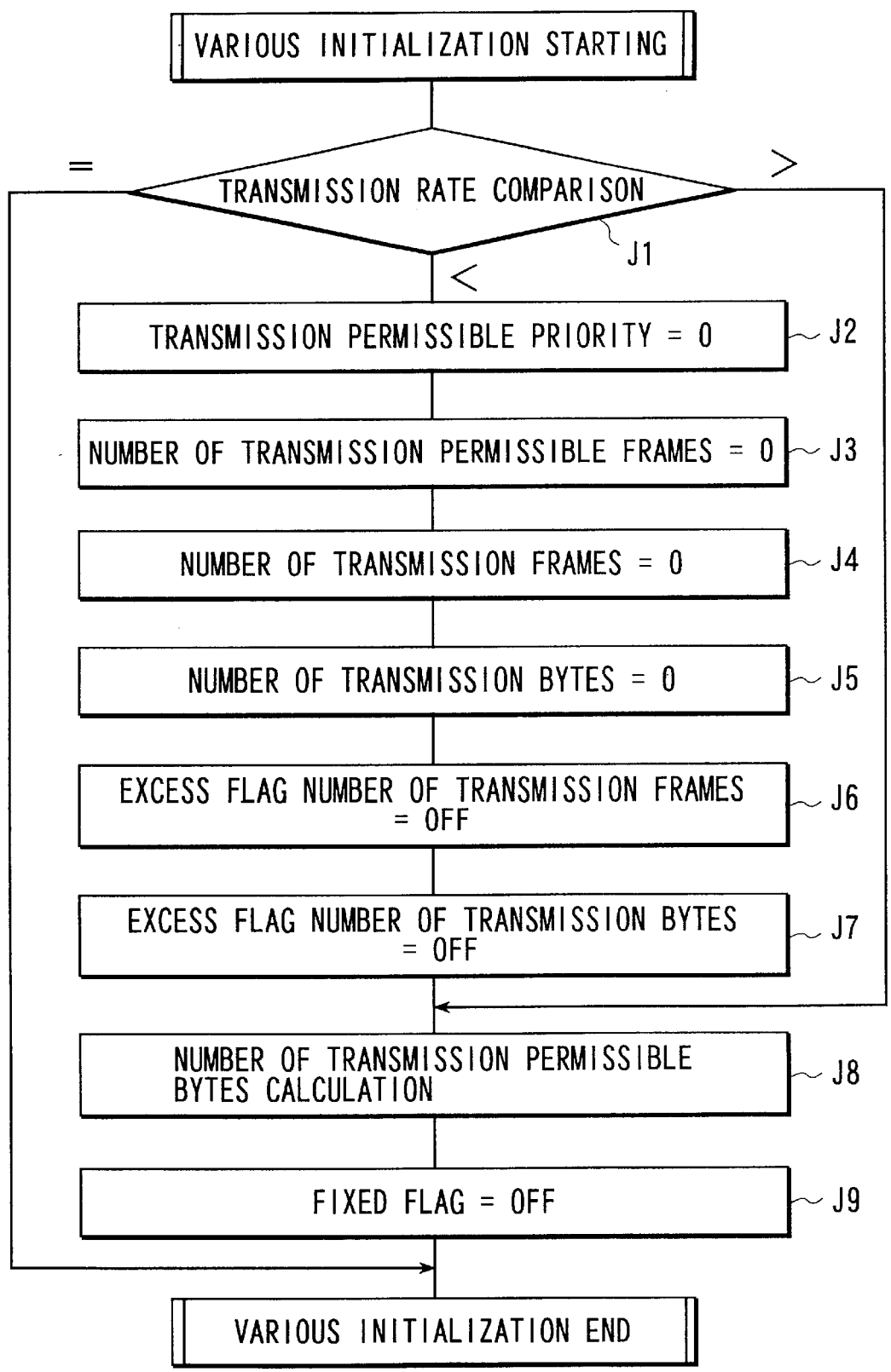
FIG. 27 is a flow chart for illustration of a processing procedure of initialization (step 13) in FIG. 26.
Figure 28:
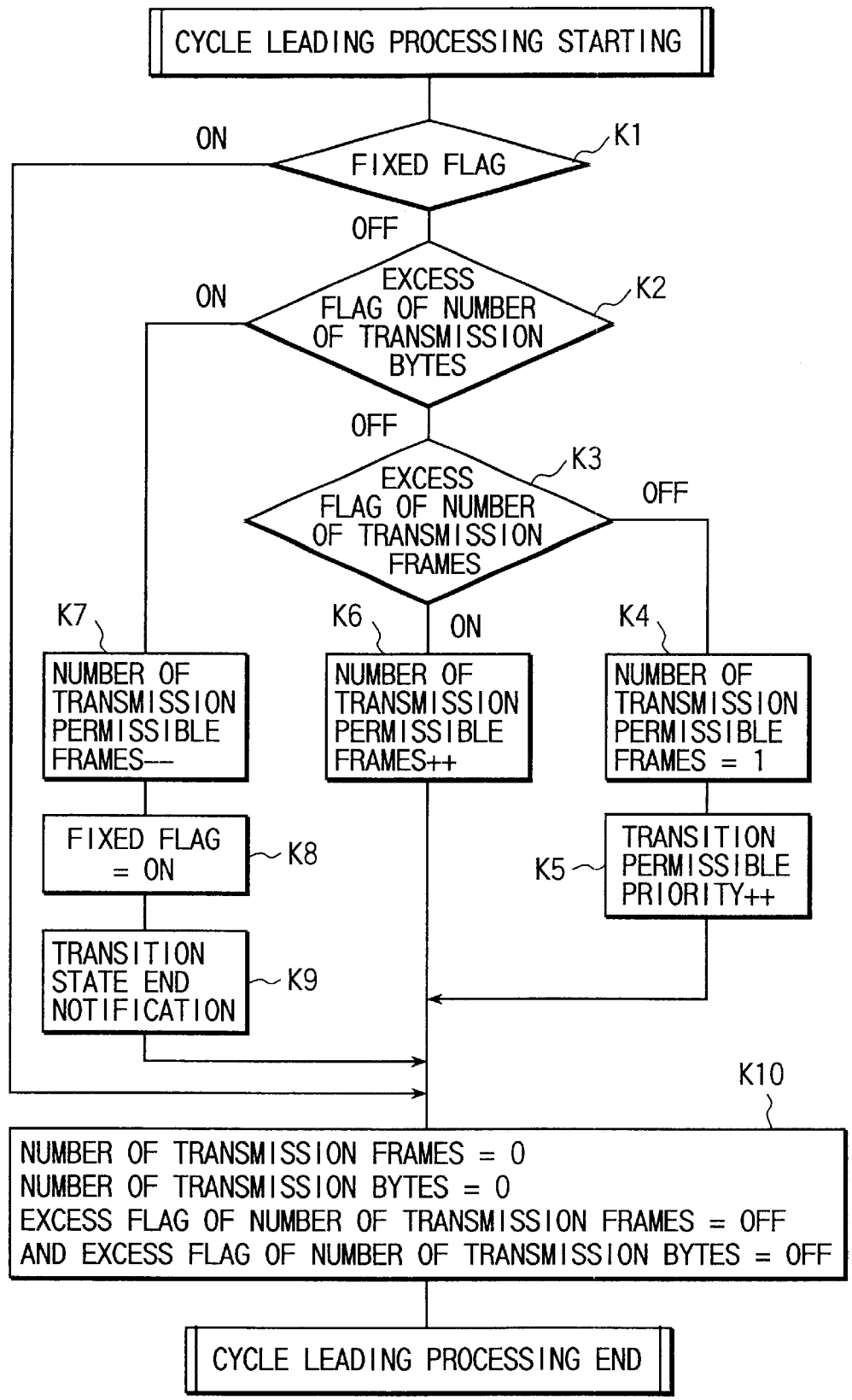
FIG. 28 is a flow chart for illustration of a processing procedure of cycle leading processing (step 15) in FIG. 26.

Below, there will be described stream transmission processing accompanying stream shaping in the transmission node 11 when setting change of a transmission rate is requested by a QoS setting message in reference to flow charts of FIG. 26 to FIG. 28. In the relay node 12, too, similar transmission processing is performed.

When the stream conversion section 23 receives a QoS setting message sent from the QoS controller 25 in the reception node 13, the stream conversion section 23 judges that resetting of a transmission rate is requested (step I1).

There is required a certain time length from when an actual transmission rate is a value set currently (at first, the maximum transmission rate) till an actual transmission rate reaches a transmission rate a QoS message requests, in other words till QoS parameter (transmission rate) update processing is completed. The time length is called a transition state period. When further feed back control is overlapped by the QoS controller 25 in the reception node 13 during a transition state time period, the system comes to be unstable.

Therefore, the control state notification section 234a in the stream conversion section 23 sends a transition state starting notification message (which is one of QoS state messages) which notifies transition state starting to the QoS controller 25 of the reception node 13 (as a centralized QoS management node) at a starting time of a transition state time period so that the above described feed back control may be ceased in the transition state time period (step I2). The manager and controller 256 provided in the QoS controller 25 of the reception node 13 sets a transition state flag to ON and controls so that QoS control (feed back control) based on a link load and a node load is ceased in the QoS controller 25 during a time period when the flag is ON.

When a transition state starting notification message is transmitted at the step I2, there will be performed initialization (step I3), which will be described below, in the stream conversion section 23 of the transmission node 11 which is a control target node.

First of all, (the transmission/annulment judgment section 235 of) the stream conversion section 23 compares a new transmission rate requested by a QoS setting message with a transmission rate set currently (step J1).

If the new transmission rate is smaller, the stream conversion section 23 sets a priority (transmission permissible priority) as the first level variable threshold which serves as a demarcation (judgment standard) for frame transmission/annulment to an initial value 0 (the highest priority) (step J2). A frame with the same priority as the transmission permissible priority is a target for judgment of frame transmission/annulment using the number of transmission permissible frames or the number of transmission permissible bytes, described later, as standards.

The stream conversion section 23 sets the number of transmission permissible frames as the second level variable threshold, which shows the number of frames which can be transmitted in one cycle, to a initial value of 0 (step J3).

The stream conversion section 23 sets (a result of) the number of transmission frames in a current cycle and (a result of) the number of transmission bytes in a current cycle to respective initial values of 0 (step J4, J5).

The stream conversion section 23 sets an excess flag of number of transmission frames which shows a comparison result of the numbers of frames and an excess flag of number of transmission bytes which shows a comparison result of the numbers of transmission bytes to the respective states of OFF (step J6, J7).

The stream conversion section 23 calculates the number of bytes as the upper bound limit for data which can be transmitted in one cycle (one GOP cycle) (the number of transmission permissible bytes) from a newly requested transmission rate (step J8).

The stream conversion section 23 sets a fixed flag indicating that an actual transmission rate reaches a specified (requested) transmission rate, that is stream shaping control (QoS control) reaches a steady state to the state of OFF (step J9).

By the processing described above, the initialization of the step I3 when a new transmission rate is lower than a current transmission.

The following parameters are called each by a control parameter of a generic name, which are: the number of transmission permissible bytes; a transmission permissible priority; the number of transmission permissible frames; the number of transmission frames; the number of transmission bytes; an excess flag of number of transmission frames; an excess flag of the number of transmission bytes; and a fixed flag. These control parameters are stored in the control state holding section 234.

On the other hand, when a new transmission rate is higher than a current transmission (step J1), program flow goes to steps J8, J9 skipping the steps J2 to J7 and the stream conversion section 23 executes processing of the steps J8, J9 and not only calculates the number of transmission permissible bytes from the new transmission rate but sets a fixed flag to the OFF state.

When a new transmission rate is equal to a current transmission rate (step J1), that is when resetting of a transmission rate is unnecessary, the stream conversion section 23 terminates the initialization of the step I3 with nothing done. In the embodiment, when there is no transmission rate change, a QoS setting message is not issued and thus this case does not exist.

Then the stream conversion section 23 analyzes a header portion of a packet in an input stream output from the input buffer 232 in the order of input with the header analysis section 233 and judges whether the packet is a control packet or a data packet, that is whether or not the packet is a leading packet of a cycle (one GOP cycle) based on a control flag included in a packet identifier in the packet (step I4).

As a result of judgment at the step I4, if a packet analyzed in the header analysis section 233 is a control packet (cycle notification packet) inserted at the leading position of a cycle, cycle leading processing (step I5) described below is performed by the transmission/annulment judgment section 235 under a recognition that a cycle leading packet is detected.

First of all, it is checked whether or. not a fixed flag is ON (OFF) (step K1) and if the fixed flag is OFF, it is checked whether an excess flag of the number of transmission bytes is ON (step K2). That an excess flag of number of transmission bytes is ON shows that the number of transmission bytes in a previous cycle exceeds the number of transmission permissible bytes per cycle calculated from a transmission rate set currently.

If a excess flag of number of transmission bytes is OFF, it is checked whether or not a excess flag of number of transmission frames is ON (OFF) (step K3) and if OFF, that is an excess flag of number of transmission bytes and an excess flag of number of transmission frames both are OFF, the number of transmission frames is judged not to reach the number of transmission permissible frames in a previous cycle (during the same transition state time period). This state shows that there is room in the number of transmission bytes after all frames with a current transmission permissible priority are transmitted. In this case, not only is the number of transmission permissible frames is returned to 1, but a more transmission permissible priority is given by 1 (step K4, K5) and thereafter processing goes to step K10. Since an excess flag of number of transmission bytes and an excess flag of number of transmission frames both are in the OFF state at the stating time of the first cycle in a transition state time period, processing at the steps K4, K5 is performed in no relation with a transmission result in a previous cycle.

If an excess flag of number of transmission bytes is OFF and an excess flag of number of transmission frames is ON, it is judged that the number of transmission frames in a previous cycle has reached the number of transmission permissible frames. This state shows that the number of transmission permissible frames may be increased in a new cycle (,which is detected at step I4). Therefore, the number of transmission permissible frames is increased, for example, by 1 frame (step K6) and thereafter program flow goes to processing at step K10.

The case where an excess flag of number of transmission bytes is ON indicates that the number of transmission bytes in a previous cycle, as described above, exceeds the number of transmission permissible bytes for 1 cycle calculated from a transmission rate set currently, that is that a state is a steady state while a transition state period has elapsed. Then, not only is the number of transmission permissible frames decreased, for example, by 1 to return to a state one cycle prior to a current state (a state in a previous cycle) but, a fixed flag is set to ON (step K7, K8). In this case, a transition state end notification message is transmitted to the QoS controller 25 of the reception node 13 (of a centralized QoS management node) by the control state notification section 234a attached to the control state holding section 234 (step K9) and thereafter, program flow goes to processing at step K10.

When a fixed flag is already in the state of ON (step K1), neither a transmission permissible priority nor the number of transmission permissible frames is updated since a transmission rate has been reached a specified transmission rate and program flow goes to processing of step K10 with nothing done. That is, if a fixed flag is in the state of ON, neither a transmission permissible priority nor the number of transmission permissible frames is updated as far as a specified transmission rate is not changed.

In such a way, if a fixed flag is in the state of OFF when a cycle leading packet is detected (and if a cycle is not the first cycle in a transition state period) the number of transmission permissible frames (the second level variable threshold) is updated giving consideration to a transmission result in a previous cycle and a transmission permissible priority (the first level variable threshold) is also updated at need (when an excess flag of number of transmission bytes and an excess flag of number transmission of transmission frames both are in the state of OFF).

Then, at step K10 (the last step of the cycle leading processing), not only are the number of transmission frames and the number of transmission bytes both set to initial values each of 0, but an excess flag of number of transmission bytes and an excess flag of number of transmission frames both are set in the state of OFF. Thereby, the cycle leading processing of the step I5 is ceased and processing goes to step I6.

On the other hand, at step I4 when a cycle leading packet is not detected, that is when a data packet (for convenience, hereinafter referred to as frame. data) is detected, processing goes to step I6 while skipping the cycle leading processing of step I5.

Ar step I6, the transmission/annulment judgment section 235 refers to the priority table 231 using a packet identifier, as a key, of a header portion which is analyzed in the header analysis section 233 and there is thereby acquired a data priority corresponding to the identifier. The transmission/annulment section 235 compares a data priority acquired from the priority table 231 with a transmission permissible priority. In a cycle immediately after the transition state starting, that is in the first cycle of a transition state period, a transmission permissible priority is set to 1 in initialization of step I3 and cycle leading processing of step I5 thereafter.

If a value of a priority corresponding to a packet identifier is larger than that of a transmission permissible priority, that is if a priority corresponding to a packet identifier is lower than a transmission permissible priority, the transmission/annulment section 235 judges annulment of (a packet which is a constituent of) the corresponding frame data and controls the filter to annul the frame data (step I7).

If a value of a priority corresponding to a packet identifier is equal to a transmission permissible priority, the transmission/annulment judgment section 235 compares the value of adding the number of transmission bytes and the number of bytes of the target frame with the number of transmission permissible bytes (step I8). At this point, if the number of transmission bytes is smaller than the number of transmission permissible bytes, the transmission/annulment judgment section 235 compares the value of adding 1 to the number of transmission frames with the number of transmission permissible frames (the second level variable threshold) (step I9).

If the number of transmission frames is smaller than the number of transmission permissible frames, the transmission/annulment judgment section 235 judges transmission of (a packet which is a constituent of) the frame data and controls the filter 237 to transmit the frame data (step I10). In this case, the data transmission results measurement section 236 increases current values of the number of transmission bytes and the number of transmission frames by a corresponding number (step I11, I12). Actually, since processing is performed in packets each as a unit, update processing of the number of transmission frames (step I12) is performed at the time of transmission of a leading portion of a frame, that is a packet corresponding to the entire frame (a packet which is shown as a packet which has the same priority as a transmission permissible priority and only a dependency relation to a packet at a back position which has the same packet identifier by a link field, or a packet which is shown as an independent packet).

On the other hand, if the number of transmission frames exceeds that of transmission permissible frames, the transmission/annulment judgment section 235 judges annulment of (a packet which is a constituent of) the frame data and controls the filter 237 to annul the frame data (step I13). In this case, the transmission/annulment judgment section 235 sets an excess flag of number of transmission frames in the control state holding section 234 to ON (step I14).

At step I8, when the transmission/annulment judgment section 235 judges that the number. of transmission bytes exceeds the number of transmission permissible bytes, the transmission/annulment judgment section 235 judges annulment of (a packet which is a constituent of) the frame data and controls the filter 237 to annul the frame data (step I15). In this case, the transmission/annulment judgment section 235 set a excess flag of number of transmission bytes in the control state holding section 234 to the state of ON (step I16).

When a value of a priority corresponding to a packet identifier is lower than that of a transmission permissible priority, that is a priority corresponding to a packet identifier is higher than a transmission permissible priority, the transmission/annulment judgment section 235 judges transmission of (a packet which is a constituent of) the frame data and controls the filter 237 to transmit the frame data (step I17). In this case, the data transmission results measurement section 236 increases a current value of the number of a transmission bytes by a corresponding number (step I18).

When one of the above described steps I7, I12, I14, I16 and I18 is executed, the stream conversion section 23 checks whether or not a packet is at stream end (step I19), and if not at a stream end, processing returns to the leading step I1 for processing a following frame data. At this point, since processing is not resetting of a transmission rate, program flow goes to step I4 while skipping steps I2, I3 and it is checked whether or not a following packet is a cycle leading packet. Below there will be performed a similar operation to that described above.

The above described operation from the step I1 and the following steps is repeated till the last end of the stream is detected (step I19) when the last end of the stream is detected, the series of stream transmission processing is terminated.

Then, there will be described details of stream transmission processing accompanying stream shaping in the stream conversion section 23 in the transmission node 11 described above, wherein the description will made of the case where an MPEG video stream which is subjected to encoding with a content rate is transmitted at a lower transmission rate than that a specified rate by the reception node 13 (a centralized QoS management node) with respect to each cycle in reference to a representation showing a control parameter change of FIG. 29.

(a) Processing of a First Cycle Leading Packet

At starting of the first cycle in a transition state time period, there are set: the number of bytes calculated from the number of transmission permissible bytes=a specified transmission rate (step J8), a transmission permissible priority=1 (step K5) and the number of transmission permissible frames=1 (step K4).

(b) The First Cycle

In the embodiment, a frame with a priority of 1 is only I picture among 15 frames composing 1 GOP and the number of I pictures is one frame.

In the first cycle, one frame of I picture frame with the same priority as a transmission permissible priority=1 is transmitted (step I10). In the example of a stream which is a target of transfer in the embodiment, one frame of I picture is present in 1 cycle, that is in 15 frames composing 1 GOP. Accordingly, there is no chance when an excess flag of number of transmission frames assumes ON. That an excess flag of number of transmission frames=OFF means to transmit all frames with the same priority as a transmission permissible priority=1 included in 1 cycle.

(c) Processing of a Second Cycle Leading Packet

When the second cycle gets started, one of the following processings according to a state of an excess flag of number of transmission bytes.

When an excess flag of number of transmission bytes= ON, the number of transmission byte already exceeds the number of permissible transmission bytes. Accordingly, a current value (=1) of a less transmission permissible priority is given by 1 to attain 0 (step K7) and (a transmission permissible priority and the number of transmission permissible frames in) control parameters are fixed by setting a fixed flag to ON (step K8). In this case, a transition state end notification message is transmitted to the QoS controller 25 of a management node (reception node 13) judging that QoS parameter (transmission rate) update processing is terminated by reaching a specified transmission rate.

On the other hand, when an excess flag of number of transmission bytes=OFF and an excess flag of number of transmission frames=OFF, which means that there is room for further transmission in addition to transmission of all frames with a priority=1, not only the number of transmission permissible frames is set to 1 (step K4), but a current value (=1) of a more transmission permissible priority is given by 1 to assume 2 (step K5) and a target of transmission is expanded up to frames (P pictures) with a priority=2. However, since the number of transmission permissible frames=1, only one frame with a priority=2 can be transmitted.

At this point, if an excess flag of number of transmission bytes=OFF, the number of transmission permissible frames=1 and a transmission permissible priority=2.

(d) The Second Cycle

In the second cycle, since a transmission permissible priority=2 and the number of transmission permissible frames=1, not only is all of frames (I picture) with a priority=1, that is one frame, is transmitted, but one frame (P picture) with a priority=2 is transmitted. There are 4 frames (P pictures) with a priority=2 in 1 cycle and frame annulment occurs (step I13). Hence, an excess flag of number of transmission frames=ON (step I14).

(e) Processing of a Third Cycle Leading Packet

When the third cycle gets started and an excess flag of number of transmission bytes=ON (when the number of transmission bytes exceeds the number of the permissible transmission bytes in a previous cycle), a state is, in the current setting, one that a transmission rate exceeds a specified transmission rate. Therefore, an actual state is set to. a state of a previous cycle, that is a state that only a frame with a priority=1 can be transmitted (step K7) and a fixed flag is set to ON. Thereby, (a transmission permissible priority and the number of transmission permissible frames in) control parameters are fixed (step K8). Thereafter, there is continued a state that only frames with priority=1 is transferred.

On the other hand, when an excess flag of number of transmission bytes=OFF (when the number of transmission bytes does not exceeds the number of permissible transmission bytes in a previous cycle), an excess flag of number of transmission frames is first checked (step K3).

When an excess flag of number of transmission frames=OFF, it means that no frame annulment occurs, that is all frames with a priority=2 in 1 cycle are transmitted. On the other hand, when an excess flag of number transmission frames=ON, it means that 1 frame of frames (pictures) with a priority=2 in 1 cycle is transmitted and the other frames are annulled.

In this example of a stream, since there are 4 frames (P pictures) with a priority=2, in a previous cycle an excess flag of number of transmission frames must be set to ON while annulment of the frames occurs (steps I13, I14). In this case, it is set at the leading packet in the third cycle that a current value (=1) of the number of transmission permissible frames is increased by 1 to assume 2 (step K6) and thereby 2 frames (P pictures) with a priority=2 can be transmitted.

At this point, if an excess flag of number of transmission bytes=OFF, it is set that the number of transmission permissible frames=2 (with a transmission permissible priority=2 unchanged).

(f) The Third Cycle

In the third cycle, since a transmission permissible priority=2 and the number of transmission permissible frames=2, not only is all (=1) frames (I picture) with a priority=1 transmitted, 2 frames (P pictures) with a priority=2 are transmitted. There are 4 frames (P pictures) with a priority=2 in 1 cycle and frame annulment occurs (step I13). Hence, an excess flag of number transmission frames=ON (step I14).

(g) Processing of a Fourth Cycle Leading Packet

When the fourth cycle gets started and an excess flag of number of transmission bytes=ON, a sate is, in the current setting, a state that a transmission rate exceeds a specified transmission rate. Accordingly, a state is set 1 cycle prior to this cycle, that is a state that all frames with a priority=1 and 1 frame with a priority=2 can be transmitted (step K7) and a fixed flag is set to ON, whereby (a transmission permissible priority and the number of transmission permissible frames of) control parameters are fixed (step KB).

On the other hand, when an excess flag. of number of transmission bytes=OFF (when the number of transmission bytes does not exceed the number of permissible transmission bytes in a previous cycle), since there is still room though an excess flag of number of transmission frames=ON as in this example, it is set that a current value (=2) of the number of transmission permissible frames is increased by 1 to assume 3 (step K6) and 3 frames (P pictures) with a priority=2 can be transmitted.

Here, if an excess flag of number of transmission bytes=OFF (with a transmission permissible priority=2 unchanged), the number of transmission permissible frames=3.

(h) The Fourth Cycle

In the fourth cycle, since it is set that a transmission permissible priority=2 and the number of transmission permissible frames=3, not only is all (=1) of frames (I picture) with a priority=1 transmitted but 3 frames (P pictures) with a priority=2 are transmitted. There are 4 frames (P pictures) in 1 cycle and frame annulment occurs (step I13) and therefore, an excess flag of number of transmission frames=ON (step I14).

(i) Processing of a Fifth Cycle Leading Packet

When the fifth cycle gets started and An excess flag of number of transmission bytes=ON, a state is, in the current setting, a state that a transmission rate exceeds a specified transmission rate. Accordingly, this state is set 1 cycle prior to this state, that is a state that all frames each with a priority=1 and only 2 frames with a priority=2 can be transmitted (step K7) and a fixed flag is in the ON state, whereby (a transmission permissible priority and the number of transmission permissible frames of) control parameter are fixed (step K8).

On the other hand, when an excess flag of number of transmission frames =OFF, since there is still room though an excess flag of number of transmission frames=ON as in this example, a current value (=3) of the umber of the transmission permissible frames is increased by 1 to assume 4 (step K6), whereby it is set that 4 frames (P pictures) with a priority=2 can be transmitted.

Here, if an excess flag of number of transmission bytes=OFF (with a transmission permissible priority of 2 unchanged), the number of transmission frames=4.

(j) The Fifth Cycle

In the fifth cycle, since it is set that a transmission permissible priority=2 and the number of transmission permissible frames=4, not only is all (=1) frames with a priority=1 transmitted, but 4 frames (P pictures) with a priority=2 are transmitted. Since there are present 4 frames (P pictures) with a priority=2 in 1 cycle and no frame annulment occurs, an excess flag of number of transmission frames=OFF.

(k) Processing of a Sixth Cycle Leading Packet

When the sixth cycle gets started and an excess flag of number of transmission bytes=ON, this state is, in the current setting, set 1 cycle prior to this state, that is a state that all frames with a priority=1 and only 3 frames with a priority=2 can be transmitted (step K7) and a fixed flag assumes ON. Thereby, (a transmission permissible priority and the number of transmission permissible frames of) control parameters are fixed (step K8).

On the other hand, when an excess flag of number of transmission bytes=OFF and an excess flag of number of transmission frames=OFF as in this example, since it means that there is still room in addition to transmission of all frames with a priority=2, it is set that not only the number of transmission permissible frames=1 (step K4) but a current value (=2) of the number of transmission permissible frames is increased by 1 to assume 3 (step K5) so that frames (B pictures) with a priority=3 can be transmitted.

Here, if an excess flag of number of transmission bytes=OFF, the number of transmission permissible frames=1 and a transmission permissible priority=3.

(l) The Sixth Cycle

In the sixth cycle, since it is set that a transmission permissible priority=3 and the number of transmission permissible frames=1, not only are all of a frame (I picture) with a priority=1 and all of frames (P picture) with a priority=2, which are 5 frames in total number, transmitted but 1 frame with a priority=3 is also transmitted. Since there are 10 frames (B pictures) each with a priority=3 and frame annulment occurs (step I13), an excess flag of number of transmission frames=ON (step I14).

(m) Processing of a Seventh Cycle Leading Packet

When the seventh cycle gets started and an excess flag of number of transmission bytes=ON, this state is, in the current setting, set 1 cycle prior to this state, that is a state that only frames with a priority=1 and a priority=2 can be transmitted (step K7) and a fixed flag assumes ON. Thereby, (a transmission permissible priority and the number of transmission permissible frames of) control parameters are fixed (step K8).

On the other hand, when an excess flag of number of transmission bytes=OFF, since it means that there is still room though an excess flag of number of transmission frames=ON as in this example, it is set that a current value (=1) of the number of transmission permissible frames is increased by 1 to assume 2 (step K6) and 2 frames (B pictures) with a priority=3 can be transmitted.

Here, if an excess flag of number of transmission bytes=OFF, the number of transmission permissible frames=2 (with a transmission permissible priority=3 unchanged).

(n) The Seventh Cycle and Thereafter

In the seventh cycle and thereafter, control as described above is repeated till an excess flag of number of transmission bytes=ON and (a transmission permissible priority and the number of transmission permissible frames of) control parameter are fixed, that is till a specified transmission rate achieved and QoS parameter (transmission rate) update processing gets terminated. In a transition state time period from when the QoS parameter (transmission rate) update processing gets started till it is terminated, QoS judgment is stopped in the QoS controller 25 in response to a transition state starting notification message transmitted to the QoS controller 25 of a management node (the reception node 13) from (the control state notification section 234a in) the stream conversion section 23 when the update processing gets started. Hence, the system can be, with certainty, prevented from being unstable in the transition state time period since a further feed back control is not overlapped on a control target node by the QoS controller 25.

In the embodiment described above, while description has been directed to the case where a system adopts a centralized QoS management scheme, there is no limitation to this, but a distributed management scheme can be adopted.

Figure 30:
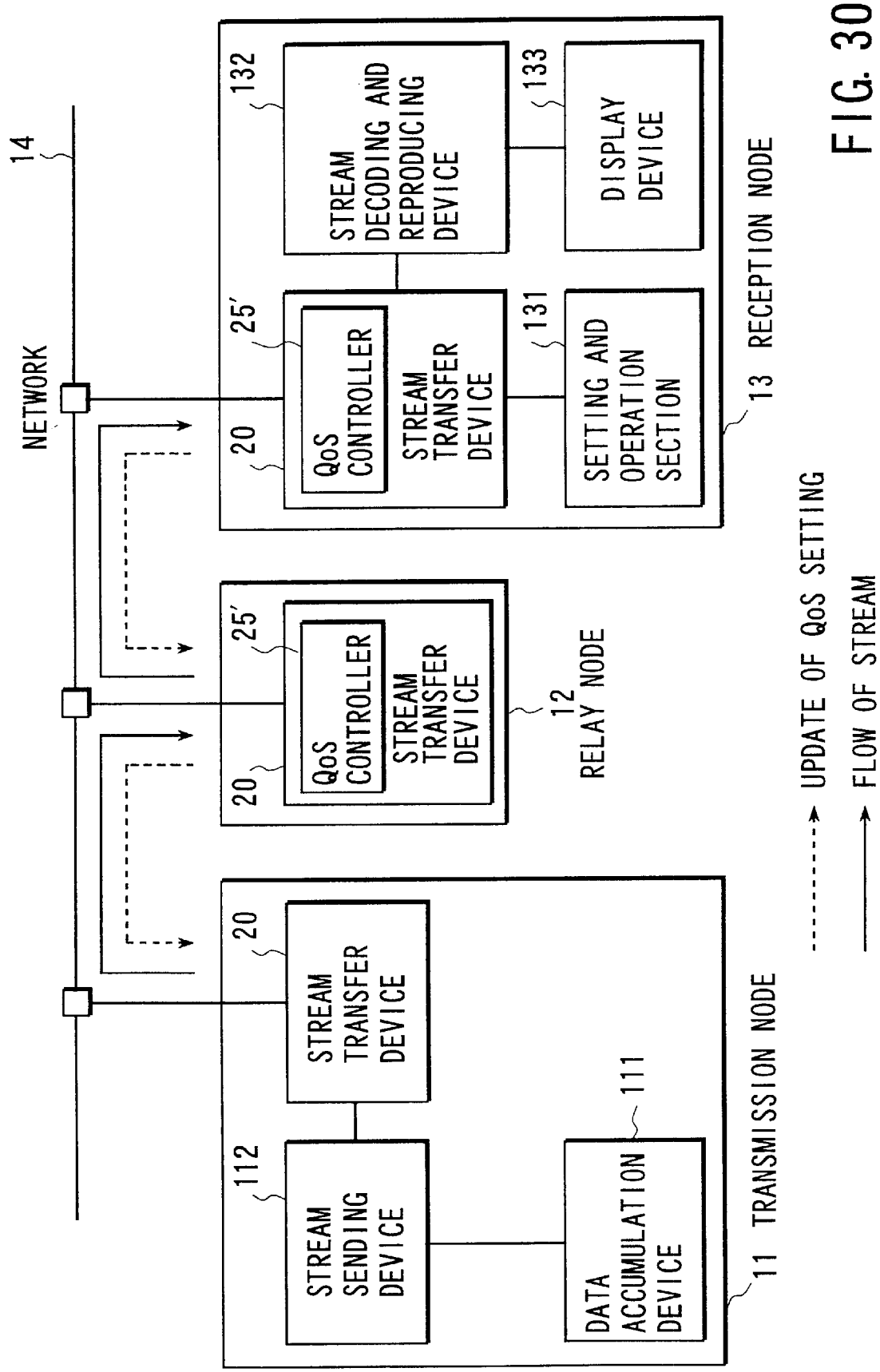
FIG. 30 is a block diagram showing an example of application of a distributed QoS management scheme in the system of FIG. 1.

In FIG. 30, there is shown an example of application of a distributed QoS management scheme in the system of FIG. 1, wherein in the figure, the same parts as those in FIG. 1 and FIG. 3 are indicated by the same marks.

In the example of FIG. 30, a QoS controller 25' (corresponding to the QoS controller 25 in the FIG. 3) which is provided in the stream transfer device 20 of the reception node 13 performs QoS parameter setting and update of the relay node 12 with the reception node 13 itself used as a monitoring target node and the relay node 12 at the front stage used as a control target node. In other words, the QoS controller 25' in the reception node 13 collects a link load (data reception results in the reception node 13) between the reception node 13 and the relay node 12 and a node load of the reception node 13 itself (data processing results in the reception node 13) and performs QoS parameter setting and update of the relay node 12 while determining an optimal QoS parameter for the relay node 12 based on the collection results.

The QoS controller 25' (corresponding to the QoS controller 25 of FIG. 3) provided in the stream transfer device 20 of the relay node 12 performs QoS parameter setting and update of the transmission node 11 using the relay node 12 itself as a monitoring target node and the transmission node 11 at the front stage as a control target node. That is, the QoS controller 25' in the relay node 12 collects a link load between the relay node 12 and the transmission node 11 (data reception results in the relay node 12) and a node load of the relay node 12 itself (data processing results in the relay node 12) and performs QoS parameter setting and update of the transmission node 11 while determining an optimal QoS parameter for the transmission node based on the collection results.

Figure 31:
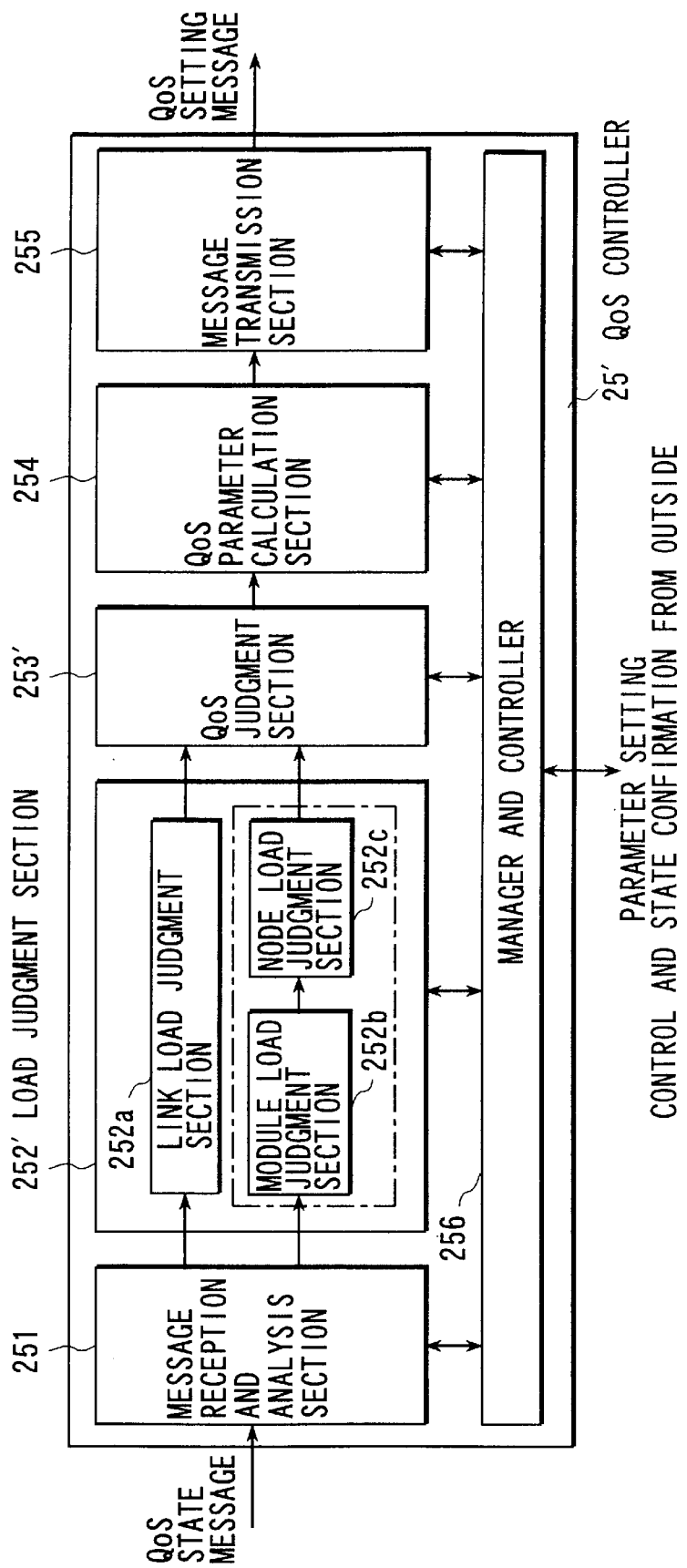
FIG. 31 is a block diagram showing a structure of a QoS controller 25' in FIG. 30.

Accordingly, in the QoS controller 25', there are created, instead of the load judgment section 252 of FIG. 4, the load judgment section 252' which is constructed with the link load judgment section 252a, the module load judgment section 252b and the node load judgment section 252c which correspond to one monitoring target node (here, a node to which the QoS controller 25' itself belongs) as shown in FIG. 31.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stream communication system comprising:

a plurality of nodes including a transmission node which is a leading stage of a stream transfer system and a reception node which is a final stage, and a network to which each node is connected, each of said plurality of nodes has a stream transfer device with the function of receiving and transmitting an encoding stream which is divided into data blocks, data attribute information showing a data attribute in each data block is added, and a data structure has a periodicity, at least one node is allocated as a managing node among said plurality of nodes, said managing node manages at least one node as a control target node among said plurality of nodes, and manages at least one node located in the downstream of said control target node as a monitoring target node among said plurality of nodes, said stream transfer device of said control target node comprises:

means for detecting an encoding cycle by analyzing said encoding stream;

means for obtaining a data priority from said data attribute information on each data block of said encoding stream;

means for measuring an amount of the transmission data every said encoding cycle;

means for controlling a transmission permission priority which is a first threshold used for transmission and judgment of the annulment of a data block based on results of the amount of the transmission data at a previous cycle;

means for controlling the number of transmission permission blocks which is a second threshold used for transmission and judgment of the annulment of a data block based on results of the amount of the transmission data at a previous cycle; and stream conversion means for adjusting the amount of the transfer data by comparing the data priority of each said data by comparing the data priority of each said data block with the first threshold and the second threshold, when said encoding stream is transmitted to a next stage node, to coincide with the transmission rate for which the effective transmission rate is specified, the stream transfer device of said monitoring target node comprises internal state notification means for measuring a load state in the node, and for notifying said managing node of a measurement result as an informative message of an internal state, and the stream transfer device of said managing node comprises feedback control means for recalculating a transmission rate based on the load state notified from said monitoring target node and the transmission rate currently set, and for updating the transmission rate setting by notifying said control target node of the result as a parameter setting message.

2. A stream communication system according to claim 1, wherein the internal state notification means of the monitoring target node comprises: data reception results notification means for notifying data reception results at the node; and data processing results notification means for notifying data processing results at the node, and wherein the feedback control means of the management node comprises: link load judgment means for judging a link load between the monitoring target node and a front stage node based on a data reception result notified from the monitoring target node; node load judgment means for judging a load of the monitoring target node based on a data processing result notified from the monitoring target node; overall judgment means for giving judgment for determination of a control policy for the corresponding control target node while integrating respective load judgment results of the link load judgment means and the node load judgment means; and parameter calculation means for calculating the parameter based on information which at least shows a judgment result of the overall judgment means and a transmission rate which is currently set at the control target node.

3. A stream communication system according to claim 2, comprising message transmission means for notifying said control target node of the parameter setting message which includes a parameter which said parameter calculation means calculated.

4. A stream communication system according to claim 2, wherein at least one module, which can calculate a data processing result, among modules constructing the monitoring target node, is assigned with a role as a monitoring target module, and the monitoring target module is provided with the data processing results notification means, wherein the feedback control means of the management node comprises module load judgment means for judging a load of the module based on a data processing result from the data processing results notification means provided to the monitoring target module of the monitoring target node, the number of module load judgment means being equal to the number of the monitoring target modules of the monitoring target node, and wherein the node load judging means judges a node load by integrating a module load judgment result of the module load judgment means provided in a number equal to the number of the monitoring target modules.

5. A stream communication system according to claim 1, wherein the encoding stream is cyclically inserted with transfer control reference information which serves as a standard in transfer control, and wherein stream conversion means of the control target node updates the transmission permissible priority based on a transmission result in a previous cycle for each cycle which is distinguishable by the transfer control reference information.

6. A stream communication system according to claim 5, wherein the stream conversion means of the control target node transmits a data block with a higher priority than the transmission permissible priority, annuls a data block with a lower priority than the transmission permissible priority, increases, in the case of a data block with the same priority as the transmission permissible priority, the number of transmission data blocks by gradually increasing the number of transmission permissible data blocks showing the number of data blocks which can be transmitted in a cycle for each cycle which is judged by the transfer control reference information, wherein when all data blocks with the same priority as the transmission permissible priority can be transmitted in the cycle within a range of specified transmission rates, not only is the less transmission permissible priority given, but the number of transmission permissible data blocks is returned to an initial value and after a specified transmission rate is attained, update of the transmission permissible priority and the number of transmission permissible data blocks is ceased until a transmission rate setting change is requested by the parameter setting message.

7. A stream communication system according to claim 1, wherein the stream conversion means of the control target node, when a transmission rate change is requested by the parameter setting message, transmits a transition state starting notification message showing starting of a transition time period until an actual transmission rate reaches a requested, specified transmission rate to a management node as a transmitter of the parameter setting message and, when an actual transmission rate reaches the requested, specified transmission rate, transmits a transition state end notification message showing an end of the transition state time period to the management node, and wherein the feedback control means of the management node temporarily ceases the feedback control of the stream conversion means of the control target node during a time period of a transition state from when the feedback control means receives the transition state starting notification message from the stream conversion means of the control target node until the feedback control means receives the transition state end notification message from the stream conversion means.

8. A stream communication system according to claim 7, wherein the stream conversion means of the control target node transmits, at regular intervals, an internal state notification message including a parameter giving a current transmission rate to the management node during a steady state time period from when the stream conversion means transmits the transition state end notification message until the stream conversion means transmits the transition state starting notification message, and wherein feedback control means of the management node acquires a parameter giving a latest transmission rate set at the control target node while monitoring an internal state notification message including a parameter giving the transmission rate during a steady state time period from when the feedback control means receives the transition state end notification message from the stream conversion means of the control target node until the feedback control means receives the transition state starting notification message from the stream conversion means.

9. A stream communication system according to claim 4, wherein the link load judgment means comprises:

data reception results buffer adopting a first-in, first-out way for holding a plurality of
data reception results notified from the monitoring target node in the order of a time series;

weighing means for modifying the plurality of data reception results held in the data reception results buffer in the order of a time series with respective weights corresponding to the order; and comparison operation means for outputting a link load result in three levels of Link Load: Large/Link Load, Proper/Link Load, and Small based on a comparison result which is obtained by comparing an average of data reception result after the weighing by the weighing means with an upper bound threshold and a lower bound threshold corresponding to a range of permissible reception rates determined by a transmission rate set currently at the control target node.

10. A stream communication system according to claim 4, wherein the module load judgment means comprises:

data processing results buffer adopting a first-in, first-out way for holding a plurality of data processing results notified from the monitoring target module in the monitoring target node in the order of a time series;

weighing means for modifying the plurality of data processing results held in the data processing results buffer in the order of a time series with respective weights corresponding to the order; and comparison operation means for outputting a module load result in three levels of Module Load: Large/Module Load, Proper/Module Load, and Small based on a comparison result which is obtained by comparing an average of data processing results after the weighing by the weighing means with an upper bound threshold and a lower bound threshold, determined in advance, of a permissible data processing result.

11. A stream communication system according to claim 4, wherein the node load judgment means comprises:

latest module load holding means for holding a latest module load judgment result of module load judgment means whose number is equal to the number of the corresponding monitoring target modules; and selection means for selecting a judgment result showing a largest module load as a node load judgment result from a latest module load judgment result of module load judgment means whose number is equal to the number of the monitoring target module(s) held in the holding means each time a new module load judgment result gets held in the latest module load holding means.

12. A stream communication system according to claim 2, wherein the overall judgment means comprises:

latest judgment result holding means for holding a latest link load judgment result of the link load judgment means and a latest node load judgment result of the node load judgment means; and matrix judgment means for acquiring a judgment result showing a control policy for the corresponding control target node by referring to a matrix table information in which there is described a relation of combinations of all link load judgment results and all node load judgment results conceivable in advance with a judgment result in which a control policy for the corresponding control target node is indicated in three levels composed of "Transmission Rate: Increased", "Transmission Rate: Unchanged" and "Transmission Rate: Decreased" by a combination (s) of the latest link judgment result and the latest node load judgment result which are held in the latest judgment results holding means.

13. A stream communication system according to claim 12, wherein the overall judgment means further comprises:

a judgment result buffer adopting a first-in, first-out way for holding a judgment result of n times in the past acquired by the matrix judgment means in the order of a time series;

judgment result correction means for correcting a latest judgment result based on a continuous judgment result of m (m≦n) times in the past which includes the latest judgment result in the judgment result buffer when the latest judgment result gets held in the judgment result buffer; and window setting means for setting a window width indicating a value of m.

14. A stream communication system according to claim 13, wherein the judgment result correction means outputs the latest judgment result with no correction thereof if all the judgment results of m times in the past are "Transmission Rate: Increased" or "Transmission Rate: Decreased," outputs the latest judgment result after changing "Transmission Rate: Unchanged" to "Transmission Rate: Increased" if all the judgment results of m times in the past are "Transmission Rate: Unchanged," and outputs the latest judgment result as "Transmission Rate: Unchanged," regardless of the latest judgment result if all the judgment results of m times in the past include different judgment results.

15. A stream communication system according to claim 14, wherein the window setting means sets the window width according to a latest judgment result held in the judgment result buffer.

16. A stream communication system according to claim 1, wherein the feedback control means comprises transmission rate control range setting means for setting a minimum transmission rate and a maximum transmission rate showing a control range for a transmission rate according to a specification from outside, and wherein the feedback control means changes a transmission rate to a parameter giving the maximum transmission rate when a transmission rate given by a calculated parameter exceeds the maximum transmission rate, and interrupts stream transfer or continues stream transfer while changing a transmission rate to a parameter giving the minimum transmission rate when the transmission rate is lower than the minimum transmission rate.

17. A stream communication system according to claim 16, wherein the transmission rate control range setting means sets a content rate to the maximum transmission rate when the specified maximum transmission rate exceeds the content rate of an encoding stream which is a target of feedback control.

18. A stream communication system according to claim 16, wherein the feedback control means comprises control mode setting means for setting a control mode which specifies whether stream transfer is to be interrupted or to be continued while changing a transmission rate to a parameter giving the minimum transmission rate when the transmission rate is lower than the minimum transmission rate according to a specification from outside.

19. A stream communication system according to claim 1, wherein all nodes except the transmission node which is leading stages of the stream transfer system function as said managing node, and each of said managing nodes monitors itself as a monitoring target node, and makes an upstream stage node a control target node.

20. A stream communication system according to claim 1, wherein one of the plurality of nodes is assigned with a role as the management node.

21. A stream transfer node which is applicable to any of a transmission node, a relay node and a reception node of a stream transfer system which transfers an encoding stream, which is divided into data blocks, each of the data blocks being associated with data attribute information showing a data attribute corresponding to each data block, and which has periodicity in its data structure, the stream transfer node being able to be assigned as a monitoring target node, a control target node and a management node, comprising:

stream conversion means for performing stream shaping processing in which a transfer data volume is adjusted so that a transmission rate reaches a specified transmission rate by transmitting or annulling each data block when the stream transfer node is assigned with a role as the control target node, and an encoding stream is transmitted to a node in a next stage, while decreasing stepwise a transmission permissible priority indicating a demarcation between data transmission/annulment by using a data priority determined based on the data attribute information attached to each data block and increasing stepwise the number of transmission permissible data blocks with the same priority as the transmission permissible priority in the same cycle;

internal state notification means for notifying a load state at the stream transfer node to a node which is assigned with a role as the management node for the same stream transfer node by an internal state notification message when the same stream transfer node is assigned with a role as the monitoring target node; and feedback control means for performing feedback control to request a setting change of a transmission rate shown by a parameter while, when the stream transfer node is assigned with a role as the management node, the stream transfer node calculates the parameter showing a transmission rate at which real time transfer at a control target node is enabled based on information showing a load data notified by an internal state notification message from the internal state notification means of the monitoring target node and a transmission rate set currently at the control target node corresponding to the monitoring target node, and the stream transfer node notifies the parameter to the control target node by a parameter setting message according to the calculation result.

22. A stream transfer control method applied to a stream communication system which comprises a plurality of nodes including a transmission node which is a leading stage of a stream transfer system and a reception node which is a final stage, and a network to which each node is connected, wherein each of said plurality of nodes has a stream transfer device with the function of receiving and transmitting an encoding stream which is divided into data blocks, data attribute information showing a data attribute in each data block is added, a data structure has a periodicity, and at least one node is allocated as a managing node among said plurality of nodes, and said managing node manages at least one node as a control target node among said plurality of nodes and manages at least one node located in the downstream of said control target node as a monitoring target node among said plurality of nodes, comprising the steps of:

detecting an encoding cycle by analyzing said encoding stream;

obtaining a data priority from said data attribute information on each data block of said encoding stream;

measuring an amount of the transmission data every said encoding cycle;

controlling a transmission permission priority which is a first threshold used for transmission and judgment of the annulment of a data block based on results of the amount of the transmission data at a previous cycle;

controlling the number of transmission permission blocks which is a second threshold used for transmission and judgment of the annulment of a data block based on results of the amount of the transmission data at a previous cycle;

adjusting the amount of the transfer data by comparing the data priority of each said data block with the first threshold and the second threshold, when said encoding stream is transmitted to a next stage node, to coincide with the transmission rate for which the effective transmission rate is specified;

measuring a load state in the node, and notifying said managing node of a measurement result as an informative message of an internal state; and recalculating a transmission rate based on the load state notified from said monitoring target node and the transmission rate currently set, and updating the transmission rate setting by notifying said control target node of the result as a parameter setting message.

23. A stream transfer control method according to claim 22, wherein when a transmission rate change is requested by the parameter setting message to the at least one control target node from the management node, there is transmitted a transition state starting notification message showing starting of a transition state time period until an actual transmission rate reaches a requested, specified transmission rate, by stream shaping processing, from a requesting node for the transmission rate change to a requested node and if the actual transmission rate reaches the requested specified transmission rate, there is transmitted a transition state end notification message showing an end of the transition state time period to the requesting node from the requested node to notify a transition state time period at the requested node to the requesting node and thereby the feedback control at the requesting node is temporarily ceased during the transition state time period.

* * * * *

UNITED STATES PATENT AND TRADEMARK OFFICE
CERTIFICATE OF CORRECTION

PATENT NO. : 6,445,679 B1
DATED : September 3, 2002
INVENTOR(S) : K. Taniguchi et al.

It is certified that error appears in the above-identified patent and that said Letters Patent is hereby corrected as shown below:

<u>Title page,</u>
Item [57], ABSTRACT,
Line 4, "stream that" should read -- stream of --; "every" should read -- each --; and "blocks" should read -- block --
Line 5, "are added," should read -- is added, --; and "and has a periodicity" should read -- and a periodicity --
Line 9, "comprises stream" should read -- comprises a stream --
Line 14, "comprises internal" should read -- comprises an internal --
Line 17, "comprises feedback" should read -- comprises a feedback --

<u>Column 39,</u>
Line 33, "a parameter which" should read -- a parameter by which --
Line 34, "means calculated" should read -- means is calculated --

<u>Column 40,</u>
Line 14, "but the number" should read -- but also the number --
Lines 63-64, "plurality of
　　　data reception results" should not break <u>Column 41,</u>
Line 64, "by a" should read -- by --
Lines 64-65, "combination
　　　(s)" should not break Signed and Sealed this Seventeenth Day of June, 2003

JAMES E. ROGAN
*Director of the United States Patent and Trademark Office*